US00RE38704E

(19) United States
(12) Reissued Patent
Kusano et al.

(10) Patent Number: US RE38,704 E
(45) Date of Reissued Patent: Feb. 15, 2005

(54) OPTICAL DISK RECORDING METHOD EMPLOYING A PLURALITY OF RECORDING AREAS AND APPARATUS THEREFOR

(75) Inventors: Taizou Kusano, Fukuoka (JP); Yoshiro Kashiwabara, Kasuga (JP); Yasuhiro Wada, Kasuga (JP); Keisuke Umeda, Fukuoka-ken (JP)

(73) Assignee: Matsushita Electric Industrial Co., Ltd., Osaka (JP)

(21) Appl. No.: 09/987,720

(22) Filed: Nov. 15, 2001

Related U.S. Patent Documents

Reissue of:
(64) Patent No.: 5,986,988
Issued: Nov. 16, 1999
Appl. No.: 09/034,909
Filed: Mar. 4, 1998

U.S. Applications:
(62) Division of application No. 08/668,770, filed on Jun. 24, 1996, now Pat. No. 5,751,676.

(30) Foreign Application Priority Data

Jun. 26, 1995 (JP) ..... 7-158993
Jul. 3, 1995 (JP) ..... 7-167217

(51) Int. Cl.[7] ..... G11B 5/09
(52) U.S. Cl. ..... 369/47.41; 369/47.4; 369/53.29
(58) Field of Search ..... 369/32.01, 33.01, 369/47.23, 47.38, 47.4, 47.41, 47.55, 53.29, 53.3, 53.43, 53.37, 53.45, 124.01; 360/71, 72.1, 73.01, 73.03

(56) References Cited

U.S. PATENT DOCUMENTS 4,558,375 A * 12/1985 Sontheimer
5,136,560 A * 8/1992 Hangai et al.

(List continued on next page.)

FOREIGN PATENT DOCUMENTS

DE 4220694 1/1993
EP 0599628 * 6/1994

(List continued on next page.)

OTHER PUBLICATIONS

European Search Report dated Oct. 5, 2000.
Full English translation of JP–A–(U)–62–22763.

(List continued on next page.)

*Primary Examiner*—Paul W. Huber
(74) *Attorney, Agent, or Firm*—Stevens, Davis, Miller & Mosher, LLP

(57) ABSTRACT

An optical disk apparatus comprising a reproduced signal detector which digitizes a reproduced signal from an optical disk, a broadband synchronizing clock signal generator for generating a synchronizing clock signal for use in reproducing data, a signal processor for processing signals, and a disk rotation controller for controlling the optical disk by switching control modes according to the reproducing position of the disk, that is, performing CAV control using the constant rotating velocity which is the same as the current rotating velocity in a range where the synchronizing clock signal generator allows a reproduced signal to be subjected to pull-in-synchronization, and performing CLV control so that the linear velocity is constant to minimize the pull-in-enable changes of number of revolutions in a range exceeding the pull-in-synchronization range, by which arrangement the amount of change of number of spindle motor revolutions when the reproducing position of the optical pickup changes is minimized, thus further reducing power consumption and access time. The optical disk apparatus comprises a selector to switch over the control systems, and area dividing means to manage the divided areas, and while switching over CAV control and CLV control, records data, and varies the divided areas or the number of divided areas in CAV control according to recording capacities, so that lower power consumption and higher-speed access can be realized.

23 Claims, 18 Drawing Sheets

U.S. PATENT DOCUMENTS

| | | | | |
|---|---|---|---|---|
| 5,425,014 | A | * | 6/1995 | Tsuyuguchi et al. |
| 5,446,724 | A | * | 8/1995 | Tabe et al. |
| 5,528,574 | A | * | 6/1996 | Takeuchi et al. |
| 5,687,148 | A | * | 11/1997 | Uemura |

FOREIGN PATENT DOCUMENTS

| | | | |
|---|---|---|---|
| JP | 6222763 | | 2/1987 |
| JP | 6318652 | | 4/1988 |
| JP | 6460863 | | 3/1989 |
| JP | 6-119710 | * | 4/1994 |
| JP | 7312018 | | 11/1995 |
| WO | 9634387 | * | 10/1996 |

OTHER PUBLICATIONS

Full English translation of JP–A–63–81652.
Partial English translation of JP–A–7–312018.
Partial English translation of JP–A–64–60863.

* cited by examiner

OPTICAL DISK RECORDING METHOD EMPLOYING A PLURALITY OF RECORDING AREAS AND APPARATUS THEREFOR

Matter enclosed in heavy brackets [ ] appears in the original patent but forms no part of this reissue specification; matter printed in italics indicates the additions made by reissue.

This application is a divisional of U.S. application Ser. No. 08/668,770, filed Jun. 24, 1996, now U.S. Pat. No. 5,751,676.

BACKGROUND OF THE INVENTION

The present invention relates to an optical disk apparatus which serves as an external memory unit or a data file for a computer to record and reproduce a large quantity of data at high speed.

Research and development are currently under way to seek wider applications and higher performance with regard to optical disks. Optical disks constitute a recording medium with a high recording density and hence with a very large storage capacity. As an example of its application, CD-ROM drive units are finding wide acceptance for use in computers to reproduce data.

The CD-ROM drive unit is an application of the music-playback compact disk (CD) for use as a read-only memory. Operated under the system for reproducing data at a constant linear velocity (CLV), the 12-cm-diameter optical disk is used as a recording medium with a large memory capacity of about 600M bytes. In addition to the read-only CD-ROM, other products emerging from the research and development efforts are the CD-WO of write once type and the CD-R which is rewritable a number of times.

Description will first be made of the conventional optical disk apparatus for reproducing data at a constant linear velocity (CLV) by taking the CD-ROM drive unit as an example. FIG. 18 is a block diagram of the conventional optical disk apparatus. In FIG. 18, data recorded in string form on an optical disk 1 is read by an optical pickup 2, while a servo controller 3 causes the pickup 2 to follow the runout and eccentricity of the optical disk 1. The data signal is detected and digitized by a reproduced signal detector 4 into a binary signal.

A maximum time span detector 22 detects the maximum time span (11 channel clocks long with a CD-ROM) of the bit pattern from the reproduced signal, and then compares the maximum time span with a count calculated according to an output of a first reference oscillator 21. Since the maximum time span corresponds to the linear velocity in reproduction made, if the result of comparison shows that the maximum time span is shorter than the linear velocity, the maximum time span detector issues a rotation control signal to increase the rotating velocity of the disk spindle motor 7, or if the maximum time span is longer, issues a rotation control signal to decrease the rotating velocity of the spindle motor. A spindle driver 8 drives a spindle motor 7 in response to a rotation control signal.

A synchronizing clock generator 9 for generating a synchronizing clock for the reproduced signal roughly controls the rotating velocity of the spindle motor 7 so that the reproduced signal comes within a range in which it can be pulled into synchronism. For this synchronizing clock generator 9, a circuit generally called a phase locked loop (PLL) is used. The PLL circuit includes a phase comparator 11a which compares the phase of a binary reproduced signal with the phase of an output of a voltage controlled oscillator 10 (hereinafter called VCO for short) and outputs a phase difference signal, a loop filter 12 which removes high-frequency noise from the phase difference signal and decides the response characteristics of the PLL, and VCO 10 varies the oscillation frequency of the output clock according to output voltage of the loop filter 12. Thus, the PLL generates a synchronizing clock for reproducing data. As described herein, after the motor velocity is roughly controlled, the synchronizing clock generator 9 pulls the reproduced signal into synchronism and generates a synchronizing clock for use in reproducing a recorded signal.

In the optical disk 1, a data string called a frame is recorded in every block, and at the leading end of each frame, two bit patterns with the maximum time span are recorded consecutively, which are called a frame synchronizing signal. After the synchronizing clock generator 9 has pulled the spindle velocity into the pull-in enable range, for control of the rotation of the optical disk 1, the frame synchronizing signal is controlled so that its intervals are constant to make the optical disk 1 rotate at constant linear velocity (CLV) precisely.

The operation of rotation control of the optical disk 1 by a frame synchronizing signal will be described in greater detail below. A frame detector 19 detects a frame synchronizing signal based on a synchronizing clock generated from a binary reproduced signal. Since the frame synchronizing signal is generated with a period corresponding to the linear velocity during reproduction, a phase comparator 11b detects a phase difference between the frame synchronizing signal and the phase of an output of a second reference oscillator 20, and controls the spindle motor so that the period of the frame synchronizing signal is constant. The two portions enclosed by the long and short dash lines in FIG. 18 are respectively referred to as a synchronizing clock generator 9 and a disk rotation controller 15.

FIG. 19 is a diagram showing the relation between the disk radial position and the rotating velocity under a conventional 4-fold-accelerated constant linear velocity (CLV) control. As shown in FIG. 19, even if the reproducing position changes with the radial movement of the optical pickup 2, the linear velocity is precisely controlled so as to be always constant as the number of disk revolutions is controlled so as to continuously vary with changes of the reproducing position on the optical disk 1 by means of the synchronizing clock generator 9 and the disk rotation controller 15. The relation between the disk radial position and the number of disk revolutions when the linear velocity is to be constant is obtained by the following equation.

$$N=(60\ nV)/(2\pi r) \qquad \text{Eq. (A)}$$

where N: number of revolutions [rpm]

n: n-fold standard velocity

V: disk linear velocity at standard velocity [m/sec]

r: radial position on the disk [m]

In the conventional configuration mentioned above, however, in the event that the disk radial positions from 25 mm to 50 mm are accessed using FIG. 19, if the disk, which rotates at standard linear velocity of 1.3 m/sec, is driven at a velocity four times the standard velocity, the number of revolutions for the linear velocity to be constant at the disk radial positions of 25 mm and 50 mm is 1986 rpm and 993 rpm, respectively, as calculated from Eq. (A). It follows therefore that when the disk is accessed from the radial position of 25 mm to 50 mm, data cannot be reproduced correctly unless the number of revolutions is decreased from 1986 rpm to 993 rpm.

(1) Since the linear velocity must be made constant, when the reproducing position of the optical pickup varies as in a seek, a considerable delay occurs until the rotating velocity of the spindle motor varies to follow the changes of the pickup position, with the result that access time has to be excessively long.

(2) In order to quickly vary the rotation of the spindle motor, a large torque is required, so that a large amount of power is consumed, heat is generated in the spindle motor and it is difficult to reduce the size of the apparatus.

In JP-A-6-119710, a method is proposed, wherein data is demodulated according to the clock signal used when data was reproduced, so that during a seek, the rotating velocity just before the seek is maintained and when the optical pickup arrives at the target position, data starts to be reproduced and the disk rotating velocity is gradually matched to a specified linear velocity.

Nevertheless, because the rotating velocity of the spindle motor increases as the data transfer rate is increased, the above-mentioned problem has yet to be solved drastically.

The present invention has been made to solve the conventional problem and has as its object to propose an optical disk recording method and an optical disk apparatus, which reproduce with high-speed access and reduced power consumption the data recorded on the optical disk at a constant linear velocity (CLV) and, when the optical disk is used in the form of a writable disk, data is recorded on the optical disk using a combination of CAV control and CLV control with greater advantages of high-speed access and low power consumption.

SUMMARY OF THE INVENTION

To achieve the above object, the disk apparatus according to the present invention comprises a broadband synchronizing clock generator and a disk rotation controller which controls the disk rotation according to the reproducing position of the disk, more specifically, controls the rotating velocity at constant angular velocity (CAV) using the current rotating velocity in a pull-in enable range of the synchronizing clock generator and, on the other hand, at constant linear velocity (CLV) to minimize rotating-speed changes, which allow the reproduced signal to be pulled into synchronism, smaller than the rotating velocity used heretofore in a range exceeding the pull-in enable range.

Under this arrangement, when data is reproduced on the optical disk, even if the reproducing position on the optical disk changes, the rate of change of the number of motor spindle revolutions can be minimized, and therefore the spindle motor can be driven with low power consumption and access time can be reduced.

In addition to the above-mentioned components, the disk apparatus according to the present invention further comprises a selector to switch over the control circuits for CAV control and CLV control, and recording area dividing means for controlling the subdivided areas, whereby data is accessed by switching over CAV control and CLV control, and in CAV control, the subdivided areas and the number of divisions are made variable to make possible low power consumption and high-speed access.

DESCRIPTION OF THE PREFERRED EMBODIMENTS (Embodiment 1)

Figure 1:
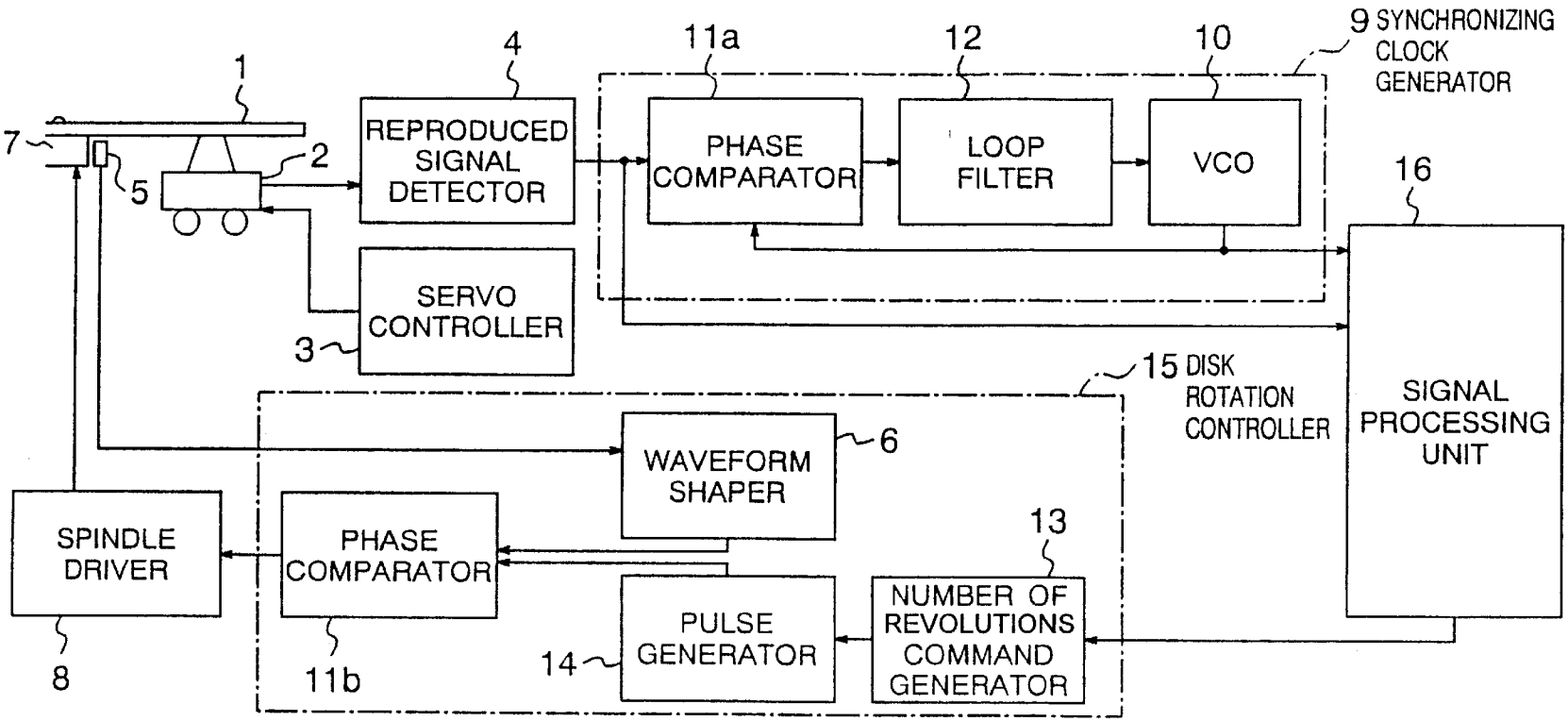
FIG. 1 is a block diagram of the optical disk in a first embodiment of the present invention.

Referring to the accompanying drawings, a first embodiment of the present invention will be described. FIG. 1 is a block diagram of the optical disk apparatus according to a first embodiment of the present invention. Reference numeral 1 denotes an optical disk on which data has been recorded at constant linear velocity (CLV), 2 denotes a servo controller for causing the optical pickup 2 to follow the runout and eccentricity of the optical disk 1, 4 denotes a reproduced signal detector for digitizing the signal reproduced from the pickup 2, 7 denotes a spindle motor which rotates with an optical disk mounted thereon, 5 denotes an encoder for generating an analog rotation signal in accordance with the motor spindle rotation, 6 denotes a waveform shaper for digitizing the analog rotation signal, 13 denotes a number of revolutions command generator (corresponding to a processor such as a CPU) for calculating a number of revolutions according to the reproducing position on the disk and issuing a number of revolutions command, 14 denotes a pulse generator for generating rotation control pulses from the output of the number of revolutions command generator 13, and 11b denotes a phase comparator for detecting a phase difference between the output of the pulse generator 14 and the output of the waveform shaper 6. The waveform shaper 6, the phase comparator 11b, the number of revolutions command generator 13 and the pulse generator 14, which are enclosed by the long and short dash line, are collectively called a disk rotation controller 15.

Additionally, reference numeral 8 denotes a spindle driver for driving the spindle motor 7 by the output of the phase comparator 11b, 10 denotes a VCO of a variable wide-band range type for outputting a clock signal while varying the oscillation frequency of the clock signal by the input voltage as a control signal, 11a denotes a phase comparator for comparing the binary reproduced signal and the output of the VCO and outputting a phase difference signal, 12 denotes a loop filter for removing high-frequency noise from the phase difference signal and thus deciding the response characteristics of the synchronizing clock generator 9, and 16 denotes a signal processor for writing a received data string into memory, demodulating the data, subjecting the data to an error correction process, and sending data to an external circuit. The VCO 10, the phase comparator 11a, the loop filter 12, enclosed by the long and short dash line, are collectively called a synchronizing clock generator 9.

Figure 2:
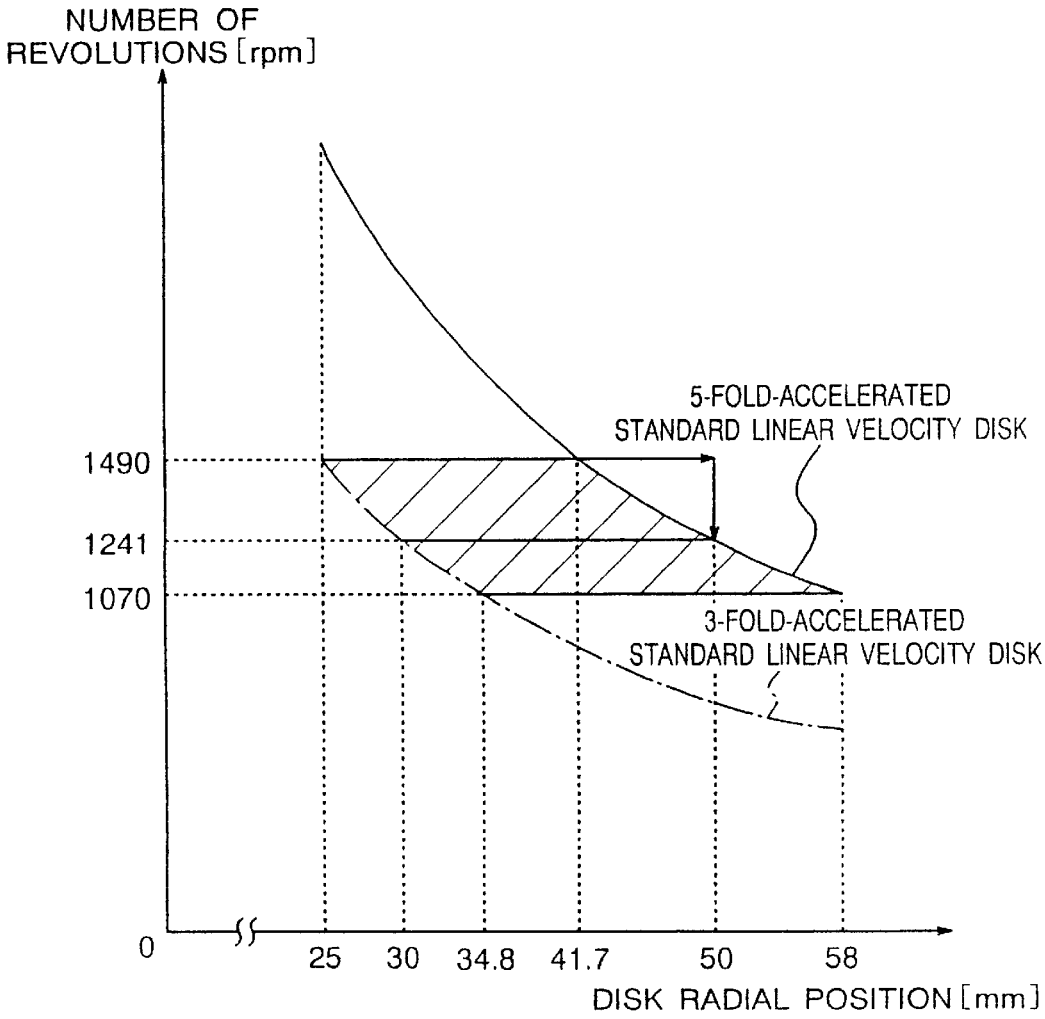
FIG. 2 shows the relation between the optical disk radial position and the rotating velocity in constant linear velocity (CLV) control.

The operation of the optical disk apparatus configured as described will be described with reference to FIG. 2. FIG. 2 is a diagram showing the relation between the optical disk radial position and the rotating velocity in constant linear velocity (CLV) control adapted to from 3-fold- to 5-fold-accelerated disk rotation. In this optical disk apparatus, the VCO 10 has an oscillation control range variable for a wide-band of over ±25%, and the synchronizing clock generator 9 is capable of generating synchronizing clock signals for a range of 3-fold acceleration to 5-fold acceleration centering on 4-fold acceleration. By utilizing the performance of the synchronizing clock generator 9 to a maximum extent, the reproduction operation is performed by setting the disk rotation at a number of revolutions corresponding to a 3-fold acceleration for reproduction at the innermost circumferential track (disk radial position of 25 mm), setting the disk rotation at a number of revolutions corresponding to a 5-fold acceleration for reproduction at the outermost-circumferential track (disk radial position of 58 mm) and setting the disk rotation at numbers of revolutions so as not to exceed the above-mentioned smallest and greatest numbers of revolutions for reproduction at the intermediate tracks (in the hatched area in FIG. 2). Thus, data can be reproduced at all radial positions by changing the rotating velocity for a range of 420 rpm from 1070 rpm to 1490 rpm.

To be more specific, heretofore, it has been necessary to change the rotating velocity for a range of 1130 rpm from 586 rpm to 1986 rpm. However, according to the first embodiment of the present invention, it is possible to perform a reproducing operation by securing 4-fold acceleration on an average, and then limiting the rotating velocity change to less than ⅓ of the previous range of disk speed change as mentioned above. The correspondence between the disk radial position and the number of revolutions can be calculated by Eq. (A).

The coordinated operation between the synchronizing clock generator 9 and the disk rotation controller 15 will be described by taking as an example a case of reproducing data from 25 mm to 41.7 mm of the disk radial position.

Suppose that the optical disk has reproduced the TOC area and is in a standby state, and that the disk radial position is 25 mm and the disk is rotating at the number of revolutions corresponding to 3-fold accelerated linear velocity.

The signal reproduced with the optical pickup 2 from the optical disk 1 is digitized into a binary signal by the reproduced signal detector 4. The synchronizing clock generator 9 generates a synchronizing clock for reproduction on the basis of the detected binary reproduced signal. In step with the synchronizing clock obtained as described, a data string reproduced from the optical disk is supplied to the signal processor 16.

The analog rotation signal detected by the encoder 5 is digitized by the waveform shaper 6 into a binary signal. In a range of radial positions from 25 mm to 41.7 mm, from address information demodulated by the signal processor 16, a number of revolutions command generator 13 makes a decision that data can be reproduced at a number of disk revolutions of 1490 rpm, and outputs the current number of revolutions command of 1490 rpm (at a radial position of 25 mm in 3-fold acceleration.) A pulse generator 14 outputs a pulse command corresponding to the above-mentioned command value, and the phase comparator 11b detects a phase difference between the pulse command and binary rotation data from the waveform shaper 6. In response to output of the phase comparator 11b, the spindle driver 8 controls the spindle motor 7 by supplying the pulse signal at a constant period.

As described above, in reproducing from disk radial positions from 25 mm to 41.7 mm, data can be reproduced by holding a number of disk revolutions in 3-fold acceleration.

Description will be made of access to the disk in the recording area exceeding a radial position of 41.7 mm. In the area exceeding the disk radial position of 41.7 mm, as is obvious from FIG. 2, by controlling the number of disk revolutions so that the linear velocity in 5-fold acceleration is constant, data can be reproduced with minimum changes of disk rotating velocity. For example, when the disk radial position is 50 mm, it is understood from Eq. (A) that reproduction is possible if the number of disk revolutions is controlled so as to be 1241 rpm. To be more specific, in the disk recording area up to a radial position of 41.7 mm, the number of disk revolutions is held at 1490 rpm, and in the area over 41.7 mm to 50 mm, the number of disk revolutions is varied under a constant linear velocity control in 5-fold acceleration as calculated by Eq. (A).

In addition, the operation in accessing the disk area toward the innermost-circumferential track will be touched on. On the basis of the current number of disk revolutions and the performance of the synchronizing clock generator, the number of revolutions command generator 13, as mentioned above, makes a decision that reproduction is possible at 1241 rpm up to the disk radial position of up to 30 mm, and outputs command values until the 1241 rpm is reached. When the disk area inside the disk radial position of 30 mm is accessed, as described above, the number of disk revolutions is varied under a constant linear velocity in 3-fold acceleration, so that data reproduction is possible with the amount of changes of the number of disk revolutions limited to a minimum.

According to this embodiment, an optical disk apparatus for reproducing at constant linear velocity (CLV) data from an optical disk on which data strings are recorded, comprising a synchronizing clock generator 9 for generating a clock signal for use in reproducing data and a disk rotation controller 15 for controlling the number of optical disk revolutions, wherein the number of disk revolutions is selected according to the reproducing position of the disk, to be more specific, the number of revolutions is controlled at the current angular velocity (CAV, namely, at the current rotating velocity) if the reproducing position is in a range in which the synchronizing clock generator 9 can pull the reproduced signal into synchronism, but the number of revolutions is controlled at a constant linear velocity (CLV) to minimize the amount of changes of number of disk revolutions of pull-in-synchronization more than with the number of revolutions used until then if the reproducing position of the disk 1 is in a range exceeding the range in which the synchronizing clock generator 9 can pull a reproduced signal into synchronization.

Therefore, the amount of changes of the number of spindle motor revolutions can be reduced when the reproducing position of the optical pickup 2 changes including its movement during a seek, for which reason the disk apparatus can be operated with low power consumption and shorter access time.

(Embodiment 2)

Figure 3:
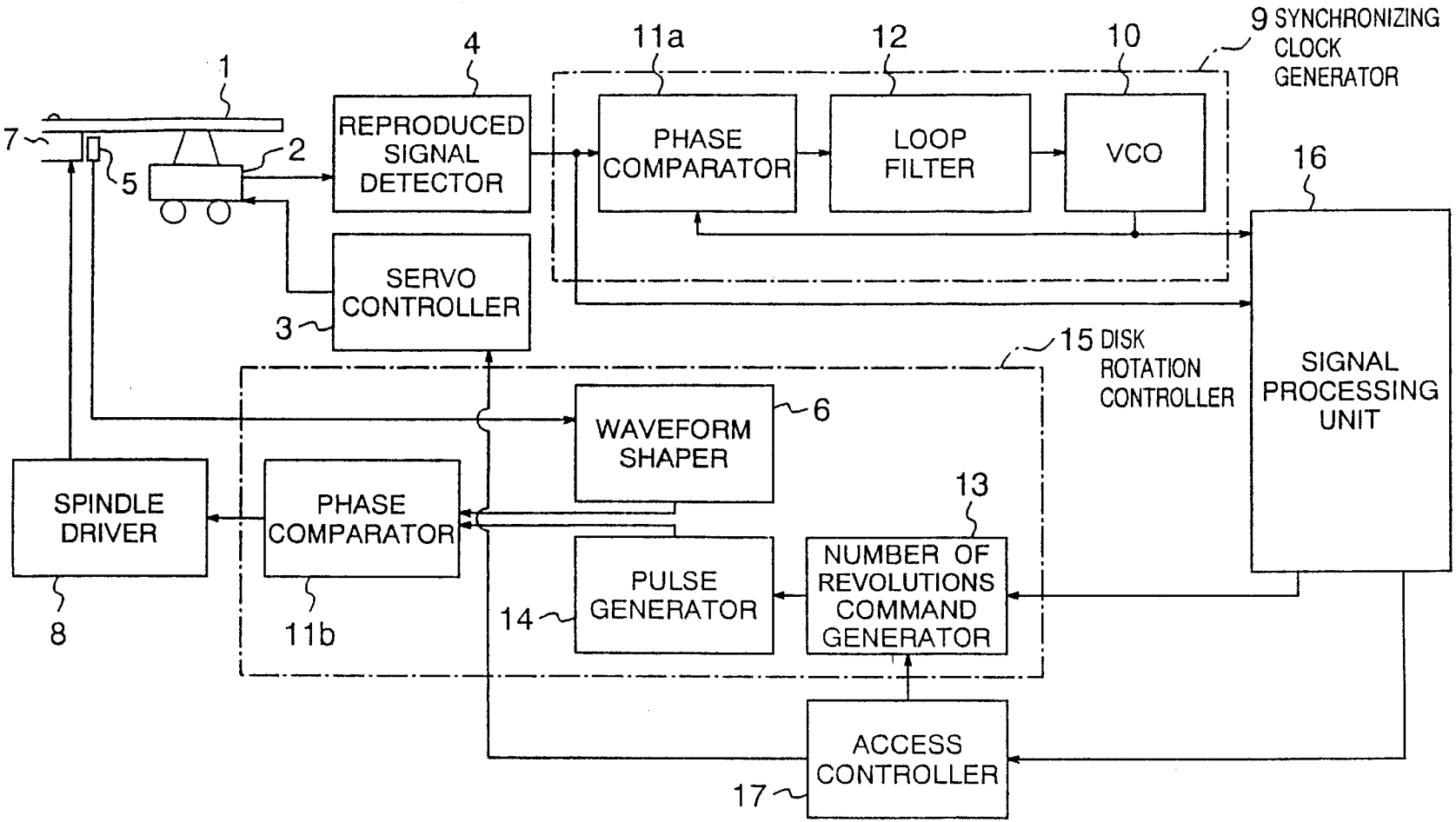
FIG. 3 is a block diagram of the optical disk apparatus in a second embodiment of the present invention.

A second embodiment of the present invention will be described with reference to the accompanying drawings. FIG. 3 is a block diagram of the optical disk apparatus according to a second embodiment of the present invention. In FIG. 3, reference numeral 1 denotes an optical disk, 2 denotes an optical pickup, 3 denotes a servo controller, 4 denotes a reproduced signal detector, 7 denotes a spindle motor, 5 denotes an encoder, 6 denotes a waveform shaper, 13 denotes a number of revolutions command generator, 14 denotes a pulse generator, 11a and 11b denotes phase comparators, 8 denotes a spindle driver, 10 denotes VCO, 12 denotes a loop filter, 16 denotes a signal processor, 9 denotes a synchronizing clock generator, and 15 denotes a disk rotation controller. Those components, being the same as in the first embodiment, are designated by the same reference numerals and their descriptions are omitted. Reference numeral 17 denotes an access controller for controlling an access action.

Figure 4:
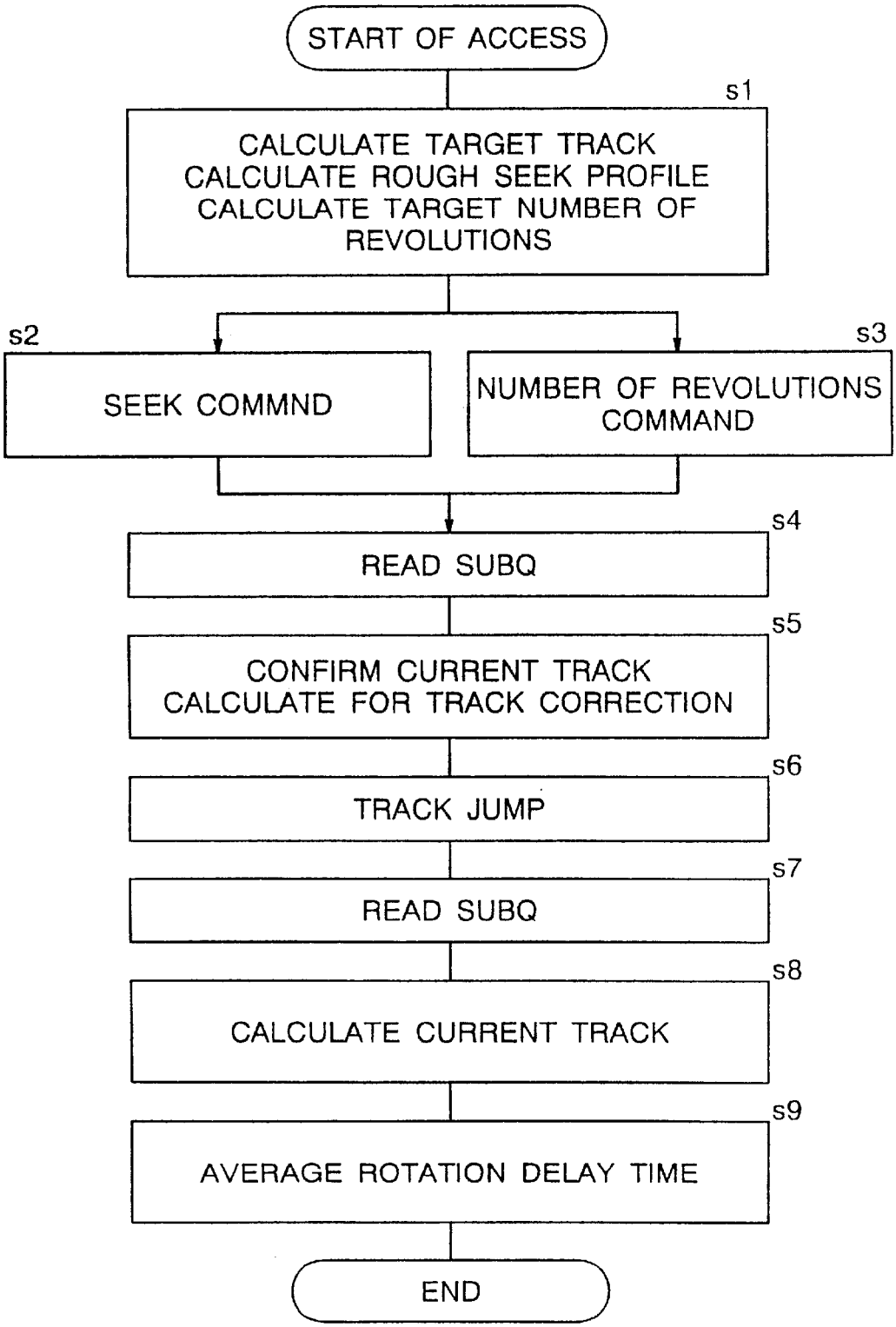
FIG. 4 is an operation flowchart in the second embodiment.

With reference to FIG. 4, description will be made of the operation of the optical disk apparatus according to the second embodiment configured as described above. FIG. 4 is a flowchart of the operation in the second embodiment.

When starting an access action, the access controller 17 sets a seek profile of a thread from the current track to a target track. In addition, the access controller 17 calculates a disk radial position from the target track, and sets as a target a number of revolutions to maintain the current number of revolutions in a range where the synchronizing clock generator 9 can pull the reproduced signal into synchronism, and also sets as a target a number of revolutions to minimize the changes of revolutions in a range exceeding the range where synchronization is possible (S1).

The access controller 17 outputs a seek command to the servo controller 3 (S2) and a number of revolutions command to the disk rotation controller 15 (S3).

Hereinafter, an ordinary access action is performed and after a rough seek action, a subQ is read (S4), the current track is confirmed and track correction calculation is performed (S5).

Then, a track jump is done for track correction (S6), the subQ is read (S7), and the current track position is calculated (S8). Acceleration or deceleration of the velocity of the spindle motor 7 has been completed, and the apparatus waits for the number of optical disk revolutions to reach a number of revolutions at which synchronization is possible (S9).

By a seek command and a number of revolutions command being output simultaneously during a seek action as described above, a seek process and a rotating speed process in the present invention are executed simultaneously, by which access time can be further shortened.

As has been described, according to this embodiment, an optical disk apparatus for reproducing data strings from an optical disk at a constant linear velocity (CLV) comprises a synchronizing clock generator 9 for generating a synchronizing clock signal for data reproduction, a disk rotation controller 15 for controlling the number of revolutions of the optical disk 1, and an access controller 17 for controlling an access action. When an access action is initiated, a synchronizing clock generator 9, on the basis of the current number of disk revolutions and the target position to be sought, controls the number of revolutions so as to maintain the current number of revolutions (CAV) in a range where synchronization is possible, and sets a target number of revolutions to minimize the amount of changes of number of disk revolutions of pull-in-synchronization more than with the rotating velocity used until then in a range exceeding the range where synchronization is possible, and the access controller 17 issues a seek command, so that after a seek is done, data can be reproduced immediately and therefore the spindle motor can be driven with low power consumption and access time can be shortened sharply.

(Embodiment 3)

Figure 5:
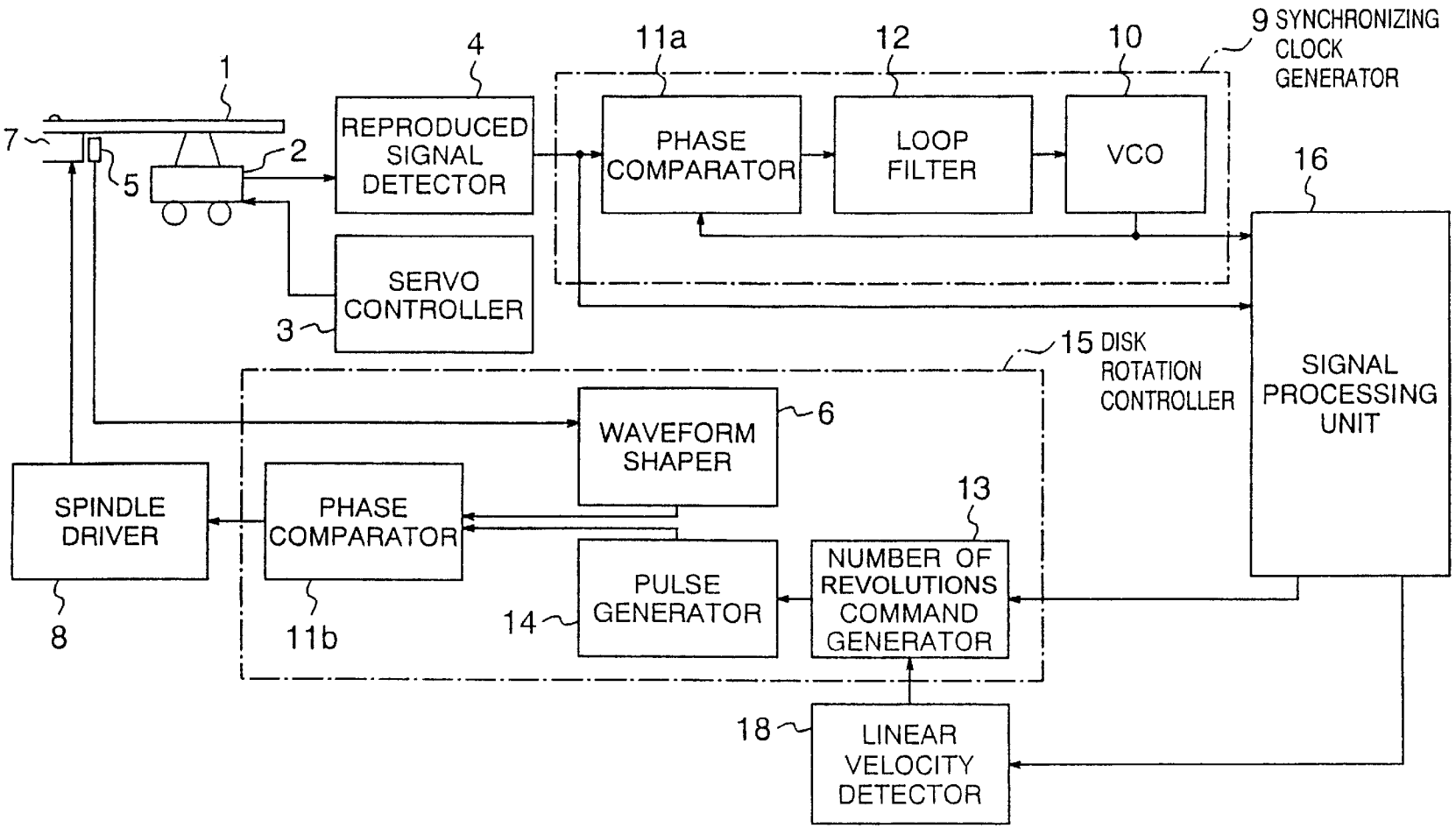
FIG. 5 is a block diagram of the optical disk apparatus in a third embodiment of the present invention.

A third embodiment of the present invention will be described with reference to the accompanying drawings. FIG. 5 is a block diagram of the optical disk apparatus in the third embodiment of the present invention. In FIG. 5, reference numeral 1 denotes an optical disk, 2 denotes an optical pickup, 3 denotes a servo controller, 4 denotes a reproduced signal detector, 7 denotes a spindle motor, 5 denotes an encoder, 6 denotes a waveform shaper, 13 denotes a number of revolutions command generator, 14 denotes a pulse generator, 11a and 11b denote phase comparators, 8 denotes a spindle driver, 10 denotes VCO, 12 denotes a loop filter, 16 denotes a signal processor, 9 denotes a synchronizing clock generator, and 15 denotes a disk rotation controller. Those components, being the same as in the first embodiment, are designated by the same reference numerals and their descriptions are omitted. Reference numeral 18 denotes a linear velocity detector for detecting the linear velocity of the optical disk when data is recorded on the optical disk.

Figure 6:
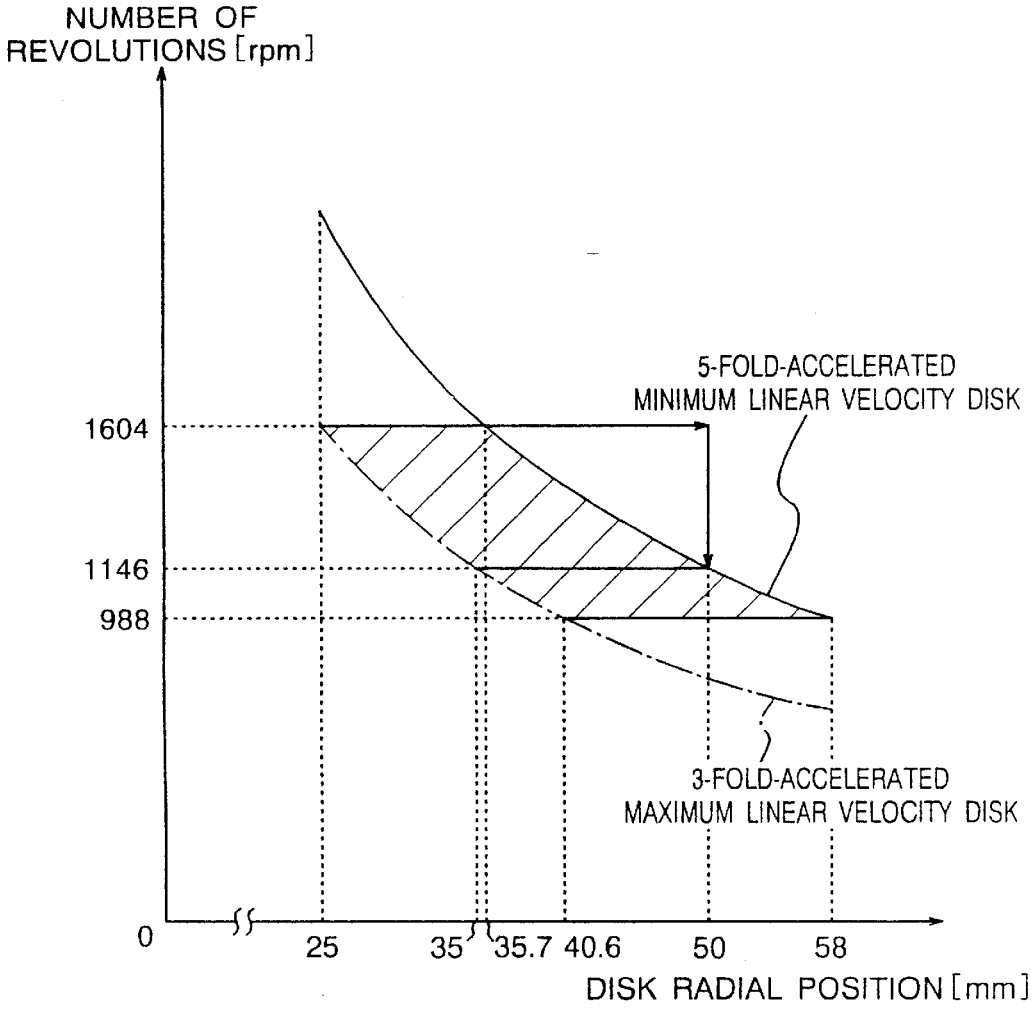
FIG. 6 shows the relation between the optical disk radial position and the rotating velocity capable of data reproduction when maximum and minimum linear-velocity optical disks are used to reproduce data.
Figure 7:
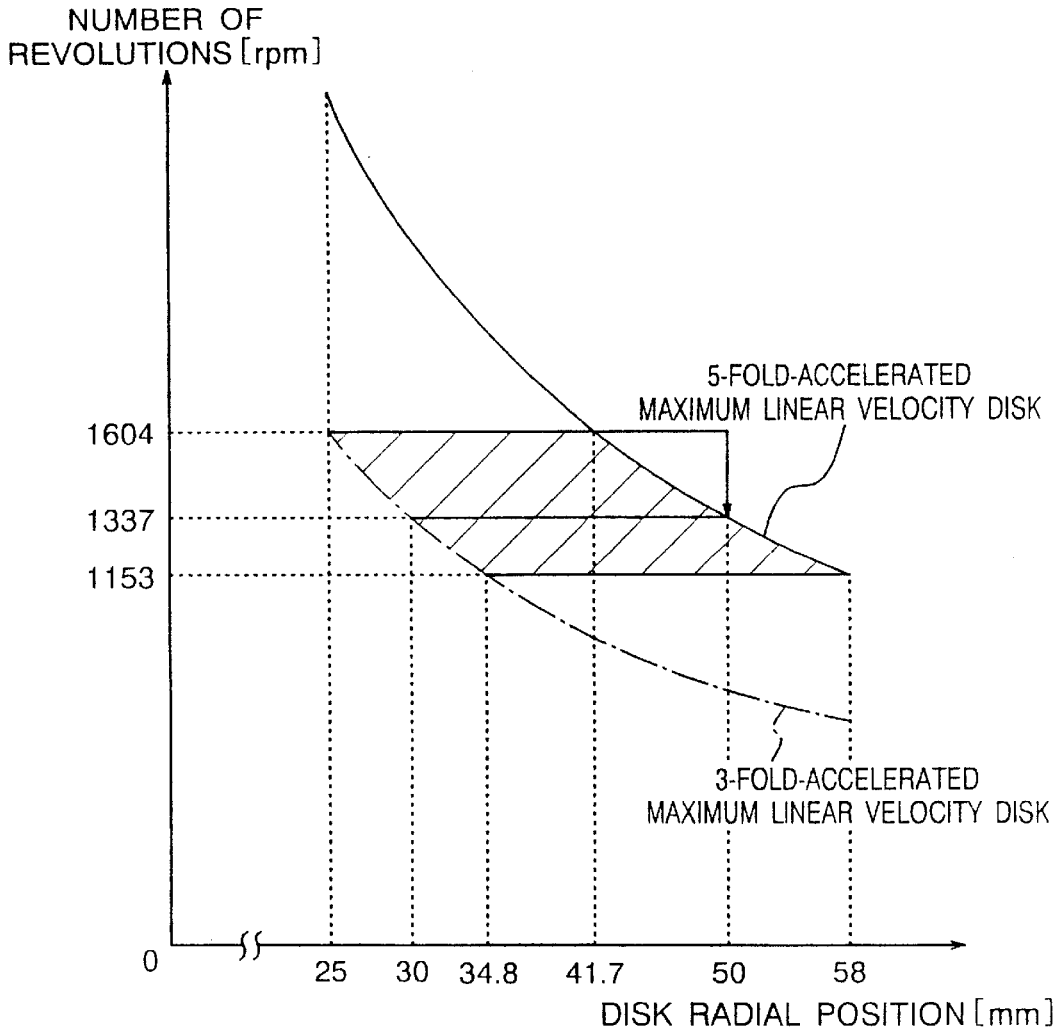
FIG. 7 shows the relation between the optical disk radial position and the rotating velocity capable of data reproduction when maximum linear-velocity optical disks are used to reproduce data.
Figure 8:
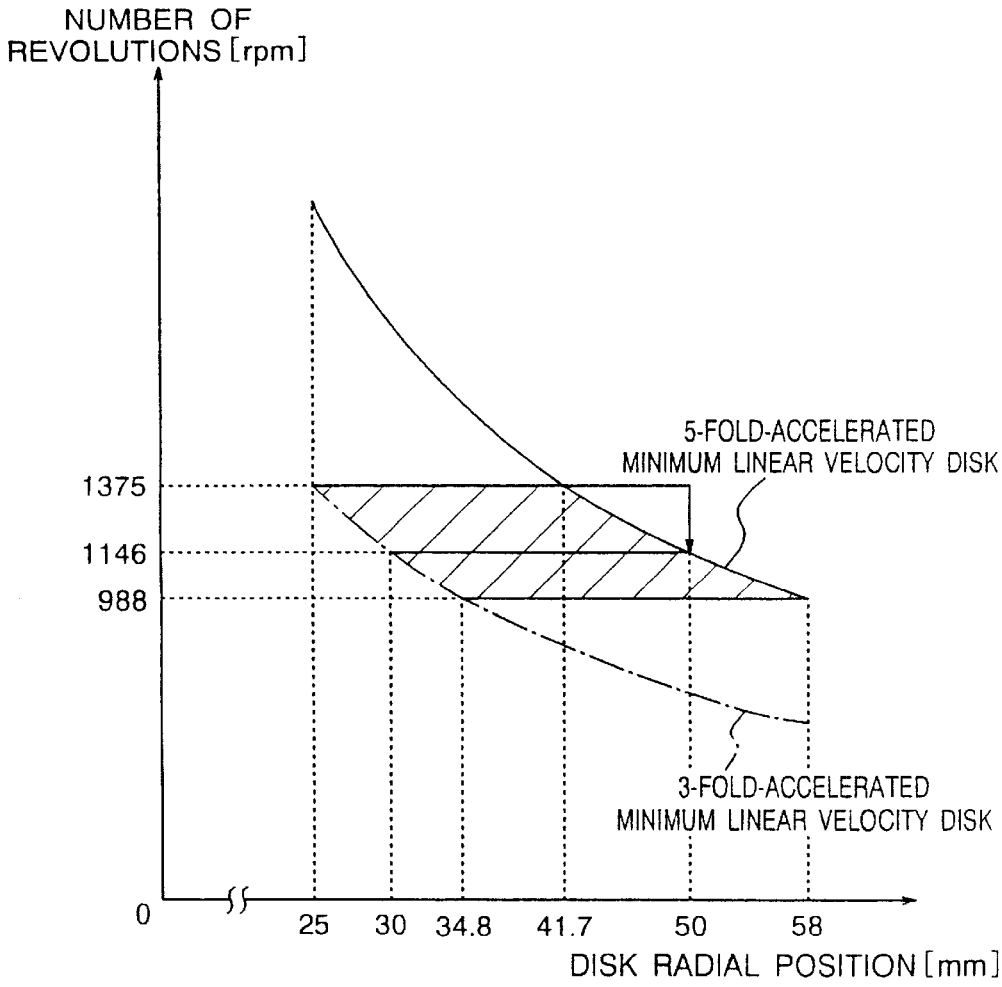
FIG. 8 shows the relation between the optical disk radial position and the rotating velocity capable of data reproduction when minimum linear-velocity optical disks are used to reproduce data.

With regard to the optical disk apparatus according to this embodiment configured as explained above, its operation will be described referring to FIGS. 6, 7 and 8. FIGS. 6, 7 and 8 are diagrams showing the relation between the optical disk radial position and the number of revolutions by which reproduction is possible in a case where data is read out of both maximum and minimum linear velocity optical disks, a case where data is read out of only a maximum linear velocity optical disk, and a case where data is read out of only a minimum linear velocity optical disk, respectively using a wideband synchronizing clock generator 9 adapted to from 3-fold- to 5-fold-accelerated disk rotation.

The optical disk linear velocity in recording is distributed from 1.2 m/sec to 1.4 m/sec. Therefore, if the linear velocity of the optical disk used is not known, unless a disk speed is changed for a range of 616 rpm from 988 rpm to 1604 rpm, it is impossible to reproduce data from all radial positions. However, if the linear velocity of the optical disk used can be detected, data reproduction is possible for all radial positions for a range of 451 rpm from 1153 rpm to 1604 rpm as shown in FIG. 7 with a maximum linear velocity disk, and also for a range of 388 rpm from 988 rpm to 1375 rpm with a minimum linear velocity disk.

Therefore, in this embodiment, the optical disk apparatus includes a linear velocity detector 18 for detecting the linear velocity of the disk used, and output of the detector 18 is used to calculate and correct the set range where synchronization is possible.

In detecting the linear velocity, from the following equation, for example, it is possible to calculate the linear velocity at the innermost-circumferential track (disk reproducing position of 25 mm) by using the set N value and a measured f value.

$$V=(2\pi r\ N)/(60\ f/t) \qquad \text{Eq.(B)}$$

where V: disk linear velocity at standard velocity [m/sec]

r: disk radial position [m]

N: number of revolutions [rpm]

f: measured length of a frame (required time for a frame [$\mu$sec]

t: 1-frame time at standard velocity=136 [$\mu$sec]

As discussed above, according to this embodiment, an optical disk apparatus for reproducing data strings from the optical disk 1 at constant linear velocity, comprising a synchronizing clock generator 9 for generating a synchronizing clock signal for use in reproduction of data, a disk rotation controller 15 for controlling the number of revolutions of the optical disk 1 and a linear velocity detector 18 for detecting the linear velocity of the optical disk 1, wherein the disk rotation controller 15 calculates on the basis of output of the linear velocity detector 18 a range in which the synchronizing clock generator 9 can pull the reproduced signal into synchronism, and controls the number of revolutions at constant rotating velocity (CAV) in a range where synchronization is possible, and also controls the number of revolutions at a constant linear velocity (CLV) to minimize the amount of changes of number of disk revolutions of pull-in-synchronizations more than with the number of revolutions used until then in a range exceeding the range where synchronization is possible.

Therefore, it is possible to precisely reduce the amount of change of number of spindle motor revolutions when the reproducing position of the optical pickup 2 changes, in such a manner as to suit the recording linear velocity of the disk used. The results are that the apparatus can be driven with reduced power consumption and that access time can be shortened.

(Embodiment 4)

In the above description of the present invention, assumption was made that the optical disk 41 is of CLV recording system in which data is recorded at a constant circumferential velocity on each track. The CLV system can maximize the amount of information that can be recorded on an optical disk. The optical disk apparatus can also adopt the CAV (Constant Angular Velocity) system for recording data at a constant angular velocity of the optical disk. To read information recorded by the CAV system, the optical disk 41 needs to be rotated at a constant angular velocity. In this case, the amount of data output varies with the radial position of the optical disk 41.

However, rotating the spindle motor at a constant angular velocity is effective in reducing power consumption. To utilize this feature of low power consumption of CAV, there is a case where switch over is made between CLV control and CAV control in accessing data. This case will be described in detail in the following.

Figure 9:
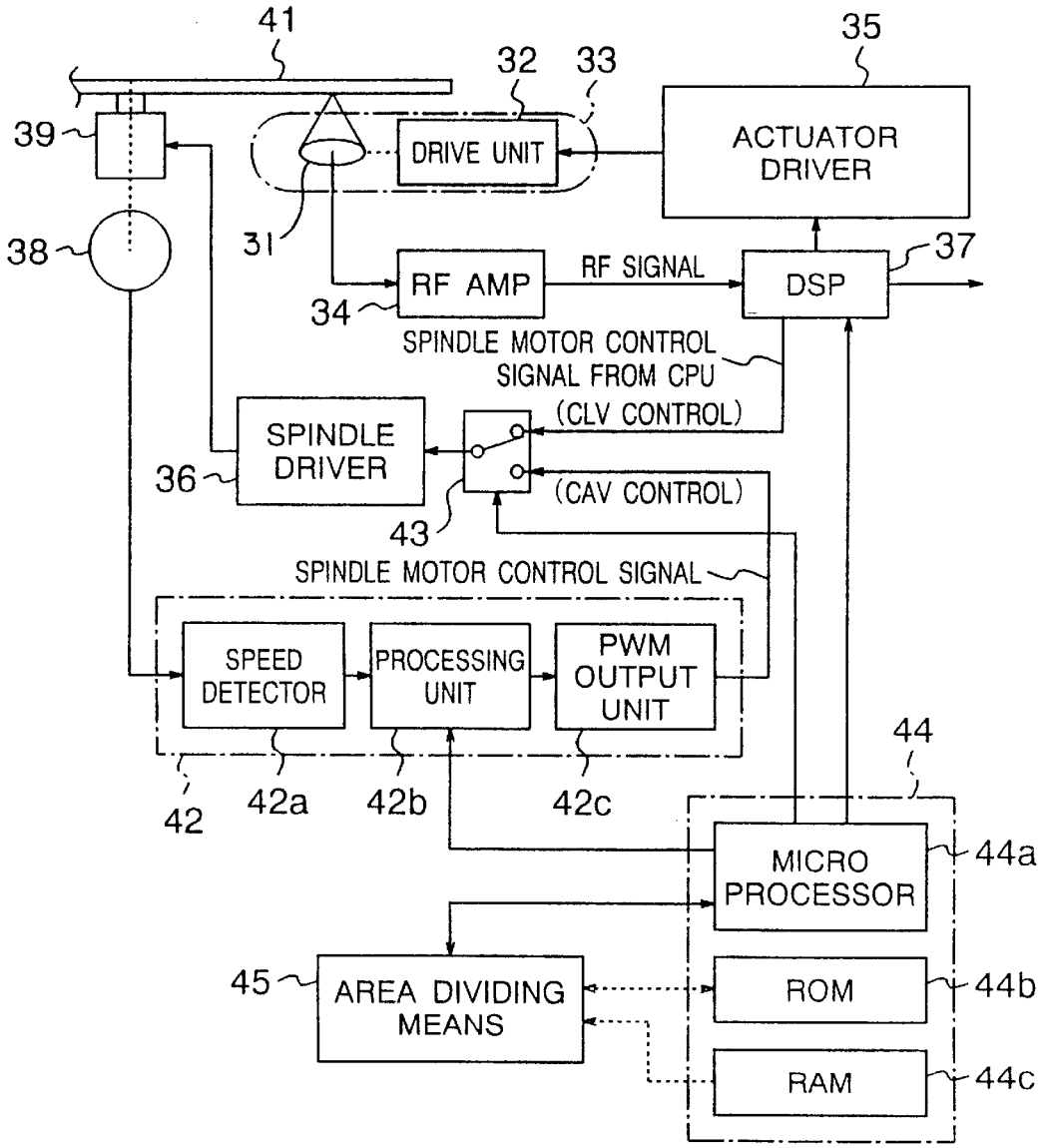
FIG. 9 is a block diagram of the optical disk apparatus in a fourth embodiment of the present invention.

An optical disk apparatus according to a fourth embodiment of the present invention will be introduced with reference to the accompanying drawings. FIG. 9 is a block diagram showing the composition of the optical disk apparatus according to a fourth embodiment of the present invention. In FIG. 9, reference numeral 41 denotes an optical disk storage medium (hereinafter referred to as the optical disk). Reference numeral 33 denotes a pickup including an optical unit 31 for applying a laser beam emitted by a laser beam emitting element (not shown) to the pit surface of the optical disk 41, and a drive unit 32 for moving the optical disk 31 in a radial direction of the optical disk 41.

Reference numeral 34 denotes an RF amplifier to amplify an electric signal from the pickup unit 33 and supply an RF signal to a digital signal processor 37 (hereinafter called DSP for short) to be described later. In response to a control signal from the DSP 37, an actuator driver 35 drives an actuator (not shown) of the pickup unit 33 to obtain an RF signal at a specified track position on the disk 41. Responding to a control signal from the DSP 37, the spindle driver 36 drives a spindle motor 39 for the optical disk 41 to rotate at a specified rotating velocity.

On the basis of an RF signal, the DSP (digital signal processor) 37 controls the actuator driver 35 to move the focal point of the laser beam from the pickup unit 33 to a specified track position. In addition, the DSP 37 includes a PLL circuit and a servo control function for controlling the spindle driver 36 to drive the optical disk 41 at a specified rotating velocity (a specified linear velocity, 4-fold acceleration for example, on the basis of the RF signal). Furthermore, the DSP 37 includes a function to decode an RF signal and convert recorded information of the optical disk 41 into data. The PLL circuit has such a wide band as a pull-in range of more than +25% that pull-in is possible from 3-fold to 5-fold acceleration centering on 4-fold acceleration.

Reference numeral 38 denotes an encoder to detect and encode the rotating velocity of the spindle motor 39 and outputs an encoded data on rotating velocity. Reference numeral 42 denotes a speed controller including a speed detector 42a for detecting the rotating velocity of the spindle motor 39 from a signal from the encoder 38, a processing unit 42b for calculating rotation control output from the detected rotating velocity and a speed control signal from a central processing unit 44 (CPU) to be described later, and a PWM output unit 42c for outputting pulses to drive the spindle driver 36, and the speed controller 42 causes the spindle motor 39 to rotate at a constant rotating velocity (specified rotating velocity, in other words, specified rotating angular velocity) on the basis of a speed control signal from CPU 44.

Reference numeral 43 denotes a selector to switch over between a spindle motor control signal from the speed controller 42 and a spindle motor control signal from the DSP 37 to control the spindle motor 39.

Reference numeral 44 denotes a central processing unit (hereinafter called CPU) to perform the control function and control the conversion function of the DSP 37. The CPU includes a microprocessor 44a, a ROM 44b which contains fixed data such as programs, and a RAM 44c to permit any data to be written in or read out and generally to temporarily store reproduced data or the like.

Reference numeral 45 denotes recording area dividing means, and its hardware portion is stored in ROM 44b and RAM 44c and its software portion occupies a software block to realize the area dividing function. The area dividing means 45 divides the recording area on the optical disk 41 into a plurality of small areas located substantially at concentric positions lying one after another in the radial direction, and manages and controls information about division, that is, the innermost and outermost circumferential tracks of all spiral tracks, divided sectors, angular velocity in disk rotation, etc.

The operation of a thus structured optical disk apparatus according to the present invention will be described. The present invention is intended to realize high-speed access and low power consumption by data access by changing between CLV control and CAV control depending on the radial position of the disk. Timing of changing between CAV control and CLV control will be described referring to the accompanying drawings.

Figure 10:
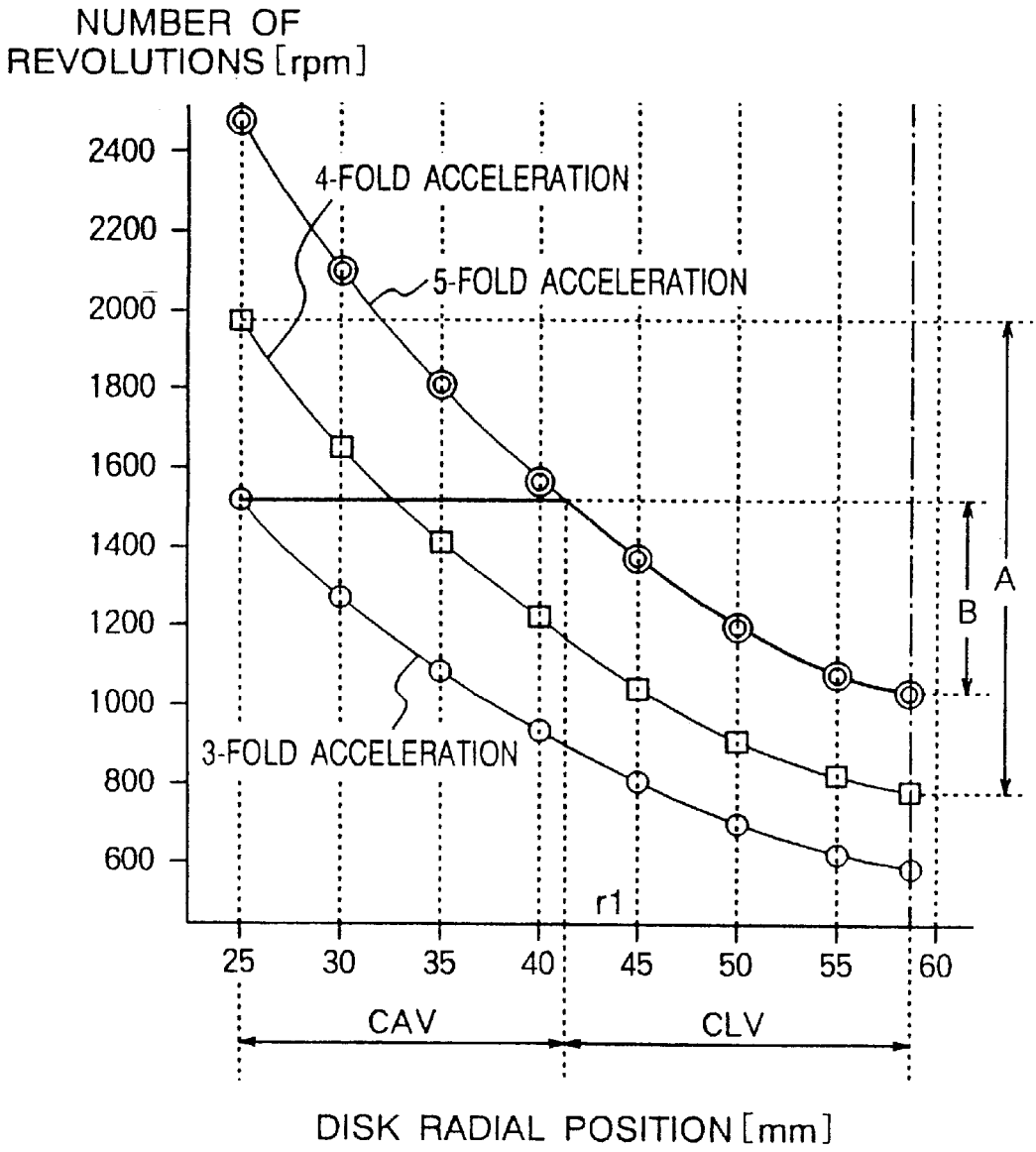
FIG. 10 shows the relation between the disk radius and the rotating velocity in the fourth embodiment of the present invention.

FIG. 10 shows the relation between the disk radius and the rotating velocity in the fourth embodiment of the present invention. In FIG. 10, to access data on the inner circumference side, CAV control is performed, and to access data on the outer circumference side, CLV control is performed. Therefore, in the conventional system, it is necessary to change the rotating velocity in the range marked by A, but in this embodiment, desired data can be accessed by changing the rotating velocity in the much narrower range marked by B. Therefore, by reducing a difference between the rotating velocities at the outer and inner circumferences and reducing the amount of speed change of the spindle motor 39, data transfer rate differences can be reduced to a minimum, and requirements for high-speed access and low power consumption can be compatible with each other.

Figure 11:
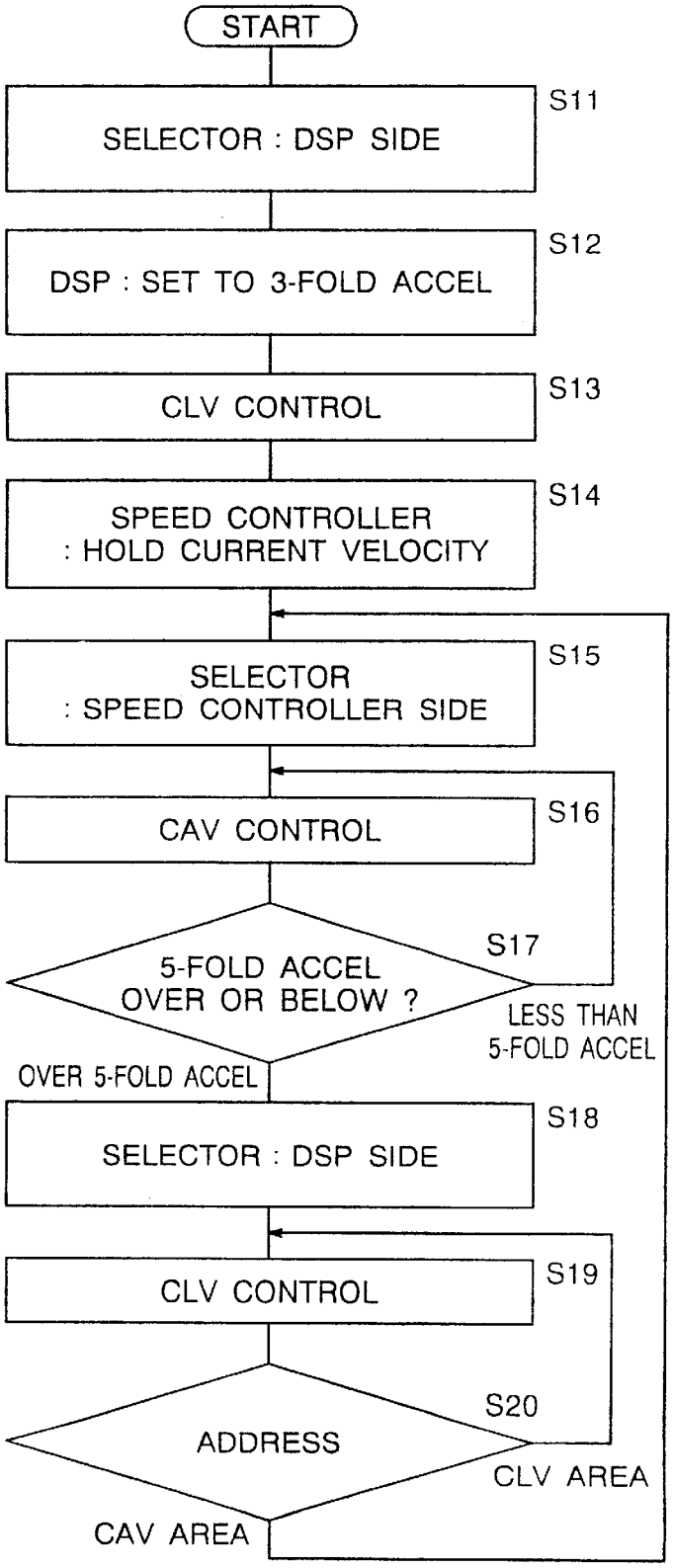
FIG. 11 is a rotation control flowchart in the fourth embodiment of the present invention.

FIG. 11 is a rotation control flowchart in the fourth embodiment of the present invention. With reference to FIGS. 10 and 11, the operation will be described. In the fourth embodiment, suppose that to simplify description, the lock range of the PLL in the DSP 37 is set to ±25%. This means that when 4-fold accelerated disk rotation is set at the center, it is possible to read data at 3-fold acceleration up to 5-fold acceleration.

The selector 43 is switched to the CLV control side by the DSP 37 (S11), the DSP 37 is set at 3-fold accelerated drive (S12), and CLV control is performed (S13). The spindle motor is started to cause the innermost-circumferential track of the optical disk 41 to rotate in 3-fold acceleration.

When the linear velocity has reached 3-fold acceleration, CPU 44 sets the speed controller 42 so that the disk rotates at the current rotating velocity (S14), and also switches the selector 43 to the speed controller 42 (S15). By these steps, it is possible to perform CAV control by which to rotate the disk at angular velocity of 3-fold acceleration at all times (S16).

Thus, CAV control is performed for the inner circumference tracks. However, as the area to be sought becomes wider toward the outer circumference, the optical disk radial position r1 which is equivalent to 5-fold acceleration in CLV control is reached. Since the PLL lock range of the DSP is adaptable to 5-fold acceleration, in the outer circumference area from r1, CLV control in 5-fold acceleration is performed.

Here, a decision is made whether or not the area of the optical disk to be accessed is beyond an address corresponding to r1 (over 5-fold acceleration) (S17), and if the area to access is inside r1 (equal to or less than 5-fold acceleration), a jump occurs to step 16 to continue CAV control. If the area to access is beyond r1, when the pickup 33 moves to the area of over 5-fold acceleration, the selector 43 is switched to the side of control by DSP 37 (S18) to perform CLV control (S19).

If a seek is made toward an inner circumference area, a decision is made on the basis of the address of the destination whether the destination of seek is in the CAV area or in the CLV area (S20), and if the destination of seek is in the CAV area, a jump occurs to step 15 (S15) where the selector 43 is switched to the speed controller side, or if the destination of seek is in the CLV area, a jump occurs to step 19 (S19) (the selector 43 is kept switched to the side of control by DSP 37) and data is accessed.

(Embodiment 5)

Figure 12:
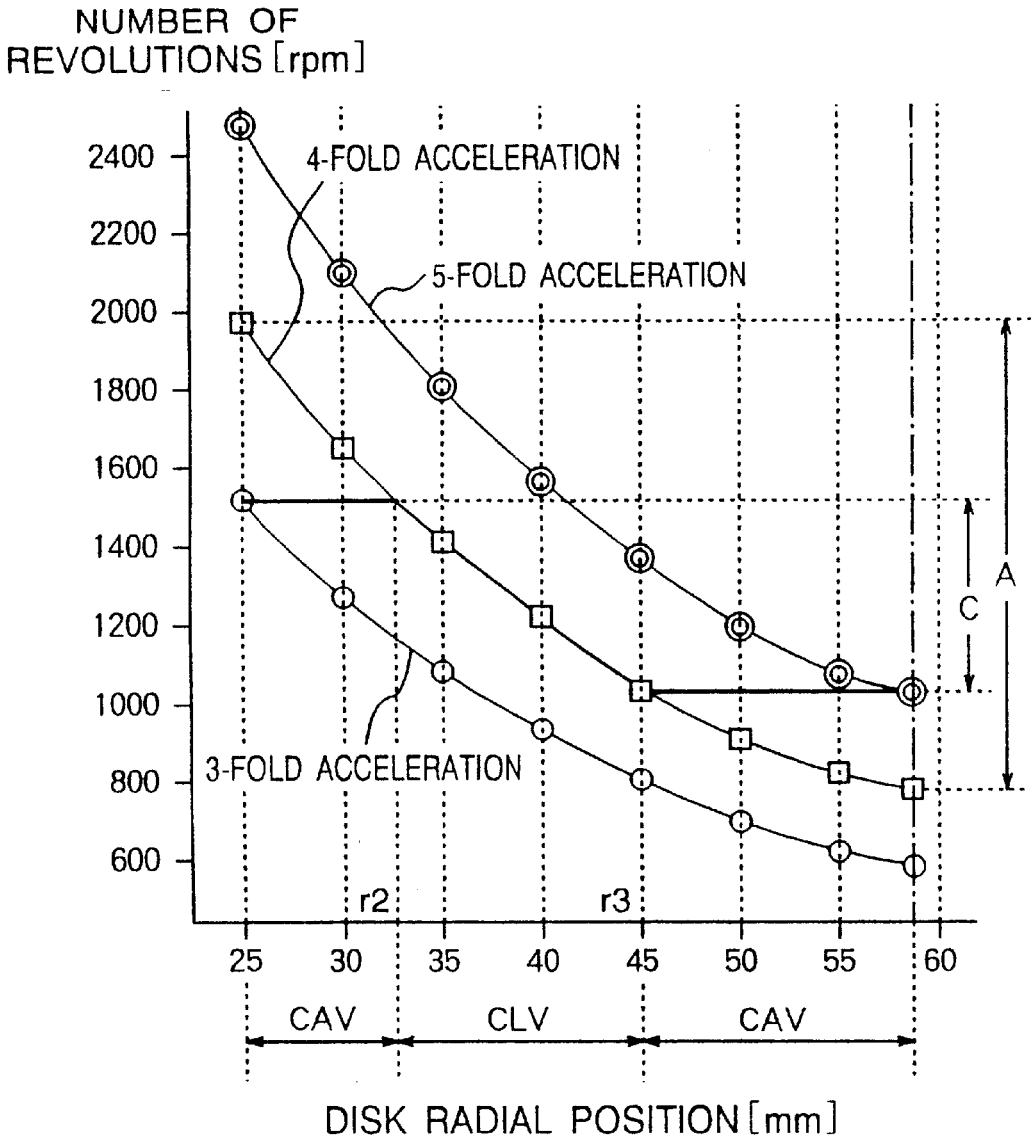
FIG. 12 shows the relation between the disk radius and the rotating velocity in a fifth embodiment of the present invention.

FIG. 12 is a diagram showing the relation between the disk radius and the number of revolutions in a fifth embodiment of the present invention. In FIG. 12, in the innermost-circumferential area, the disk is rotated by CAV control in 3-fold acceleration, in the area to be covered by CLV control in 4-fold acceleration (from disk radius r2 to r3), the disk is rotated by CLV control in 4-fold acceleration, and in the outermost circumferential area, the disk is rotated by CAV control in 5-fold acceleration.

Therefore, in the conventional system, it is necessary to change the rotating velocity in the range marked by A, but in the fifth embodiment, it is possible to access desired track by a far smaller range of speed change as marked by C. Therefore, by reducing the difference in rotating velocity between the inner- and outer-circumferential areas and reducing changes of speed of the spindle motor 39, the difference in data transfer rates can be minimized, and high-speed access and low power consumption can be made compatible.

The control operation in this fifth embodiment are almost identical with the fourth embodiment with only one exception that there are two disk radial positions r2 and r3 where control method is switched from one to another. Therefore, the control flowchart in FIG. 11 applies to the fifth embodiment and its description is omitted.

(Embodiment 6)

A divided areas CAV system will be described. As mentioned earlier, in CAV control, the optical disk 41 is rotated at a constant angular velocity. Thus, the elimination of speed change of the spindle motor 39 offers a salient effect of power consumption reduction.

However, the reproduced amount of data varies with the radial position of the optical disk 41, and a greater amount of data must be processed at high speed as the reproducing position moves toward the outer circumferential area. In these respects, some improvements are to be made. In this embodiment, the recording area of the optical disk 41 is divided into a plurality of areas lying one after another in radial direction to the divided areas, CAV angular velocities are assigned which vary in steps from one area to another, and in each of the divided areas, CAV control is performed at its assigned angular velocity. For simplicity's sake, the divided areas CAV system is described assuming that recording and reproduction are performed by rotating the optical disk 42 by the divided areas CAV system.

Figure 13:
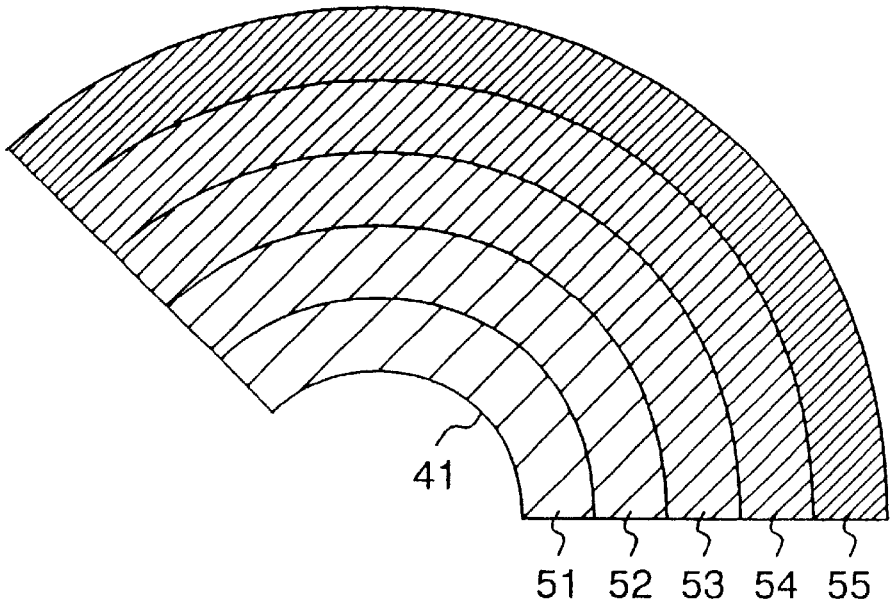
FIG. 13 is a diagram showing subdivided recording areas of the optical disk 14 in a sixth embodiment of the present invention.

FIG. 13 is a diagram showing divided areas of the optical disk 41 in a sixth embodiment of the present invention. An optical disk 41 is divided into five areas as shown in FIG. 13 by a dividing method of a basic division pattern previously stored in area dividing means 45. Then, data is distributed and recorded according to the division pattern. To be more specific, 51 denotes the innermost circumferential area, 52, 53 and 54 denote the divided areas, and 55 denotes the outermost area. FIG. 13 shows an equi-distant area division by which the area is divided into equi-distant areas, but the area may be divided in equal-capacity division by which the area is divided into equal storage capacities. However, even in the equal-capacity division, if the divided areas were divided as equi-distantly as possible, better use can be made of the characteristics of CAV control.

Figure 14:
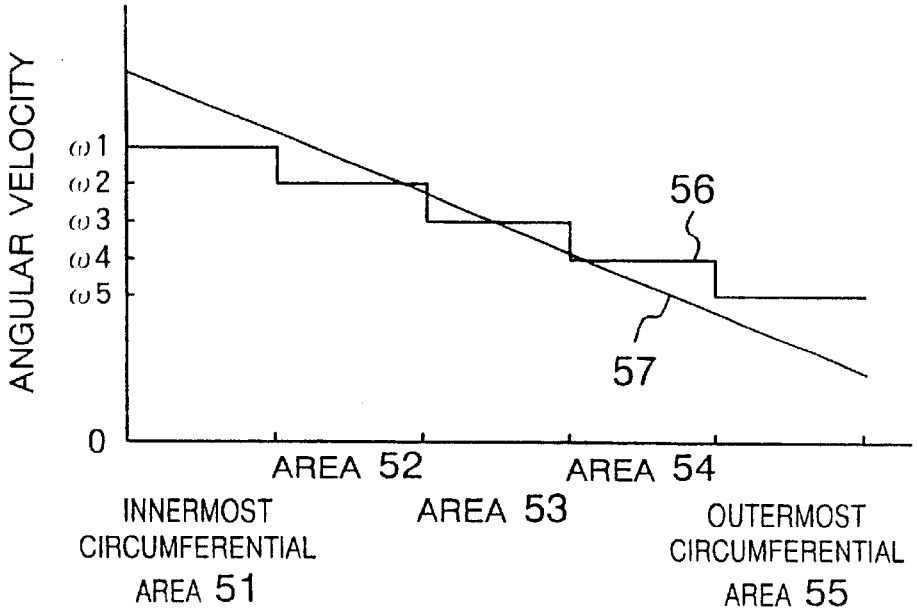
FIG. 14 shows the relation between the subdivided recording areas and the angular velocity in the sixth embodiment of the present invention.

FIG. 14 is a diagram showing the relation between divided areas and angular velocity in the sixth embodiment of the present invention. In FIG. 14, the angular velocities in accessing the areas are decided by the area dividing means 15 as shown by the polygonal line 56. To be more specific, the angular velocity in the innermost area 51 is ω1, the angular velocity in the area 52 is ω2, and similarly ω3 for the area 53, ω4 for the area 54 and ω5 for the area 55. Just for reference, the straight line 57 represents the angular velocity of the optical disk 41 if the same areas were driven by CLV system. As is clear from FIG. 14, the difference in angular velocity between the innermost and outermost circumferential areas 51 and 55 is smaller for the polygonal line of CAV system than that for the straight line 57.

With reference to FIGS. 13 and 14, description will be made of the operation when access is made to one (the area 52 for example) of the divided areas. The area dividing means 45 is cognizant of addresses of the innermost and outermost circumferences of the area 52, and so long as a track to be accessed exists in the area 52, notifies to the servo control function of the DSP 37 that access is being made at an angular velocity of ω2 in the area 52. The servo control function of the DSP 37 keeps rotating the the spindle motor 39 through the spindle driver 36 so that the pickup unit 33 can access the disk 41. Therefore, the angular velocity of the spindle motor 39 need not be changed, but the seek action can be terminated only by movement of the pickup unit 33.

(Embodiment 7)

Figure 15:
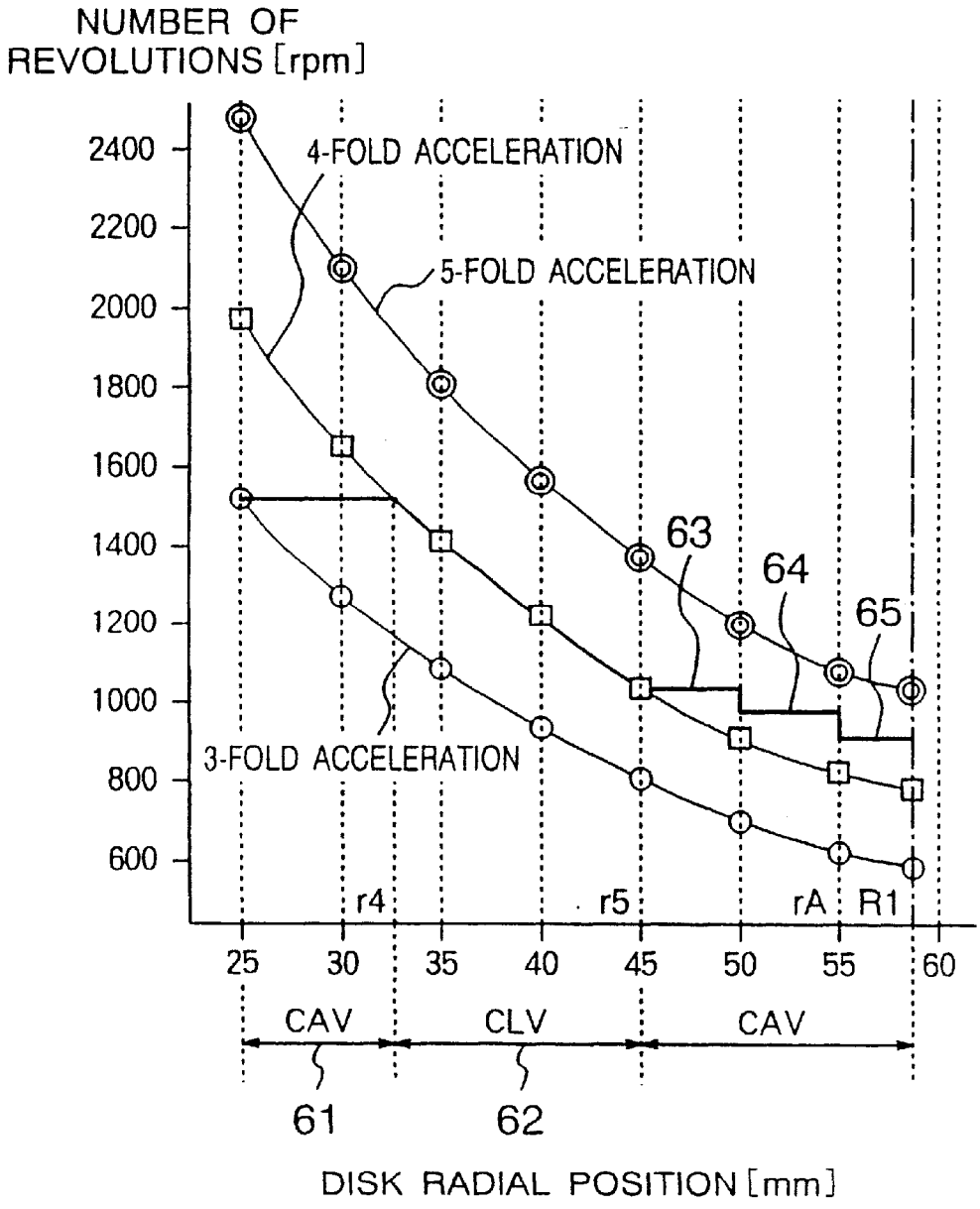
FIG. 15 shows the relation between the disk radius and the rotating velocity in a seventh embodiment of the present invention.
Figure 16A:
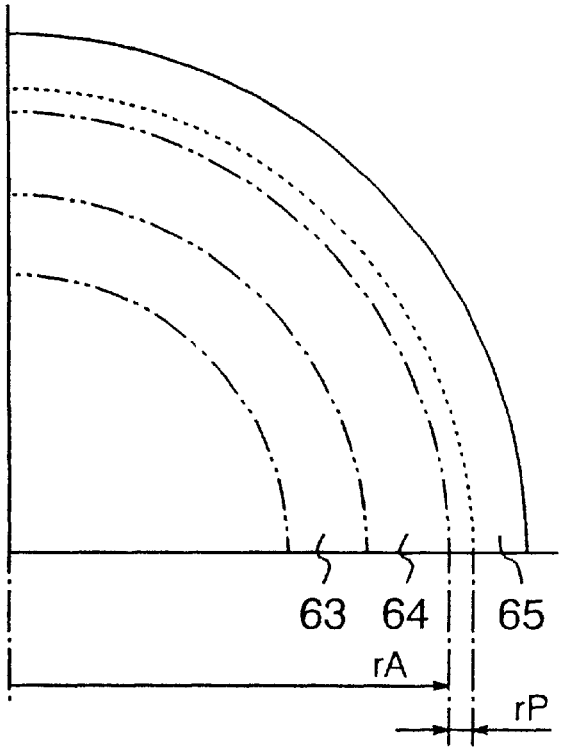
FIGS. 16A and 16B show the relation between the subdivided areas and the angular velocity in the seventh embodiment of the present invention.
Figure 16B:
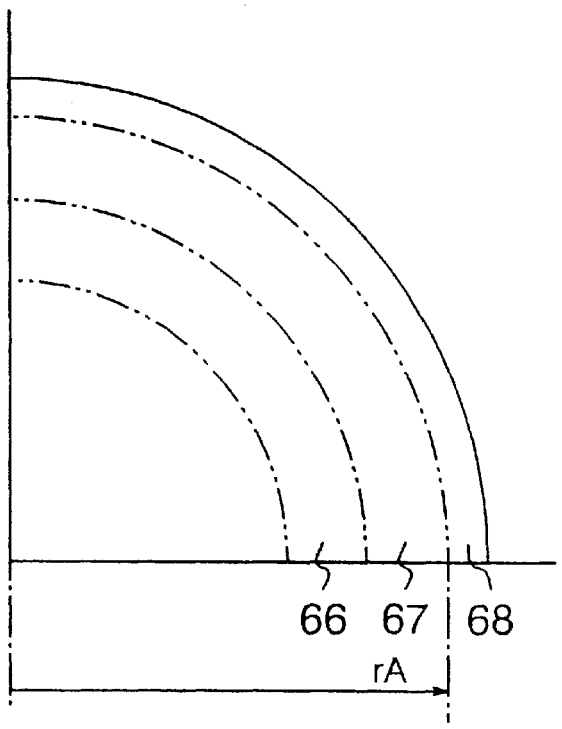
Figure 17:
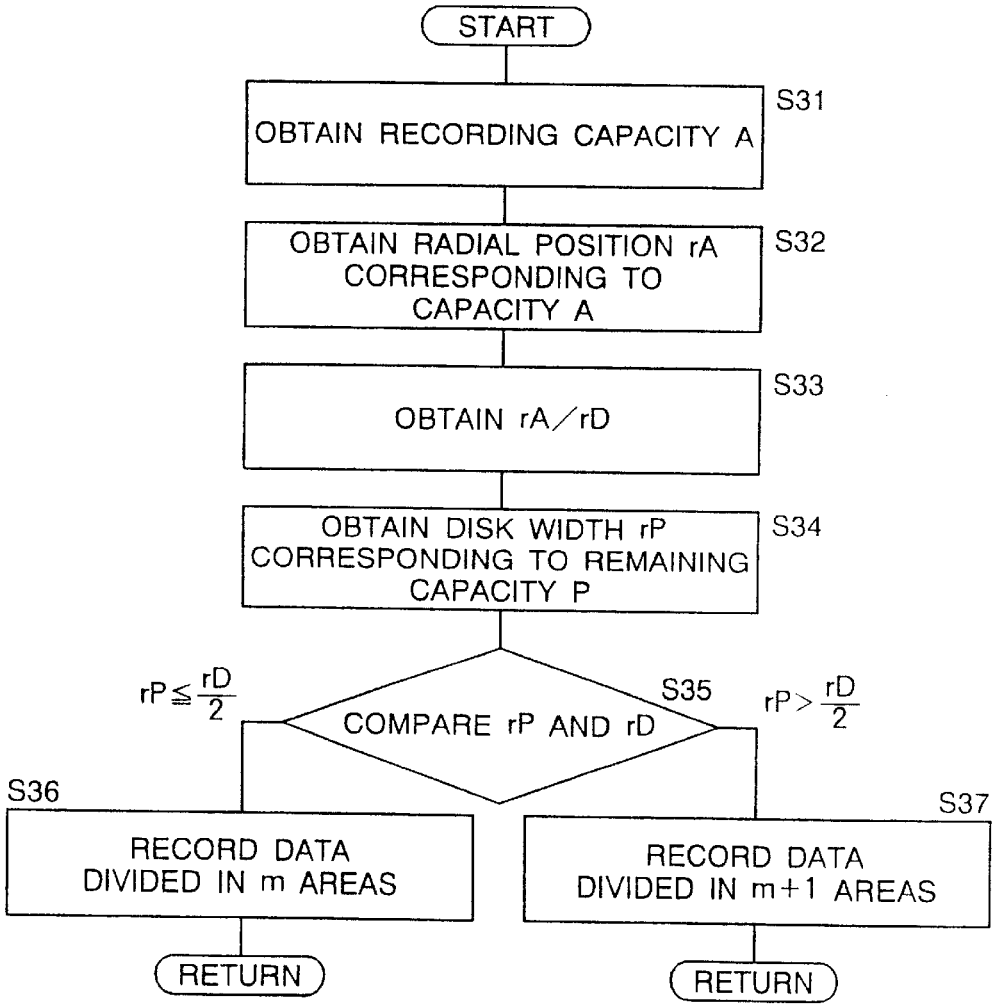
FIG. 17 is a flowchart for explaining the correcting operation of the subdivided recording areas in the seventh embodiment of the present invention.
Figure 18:
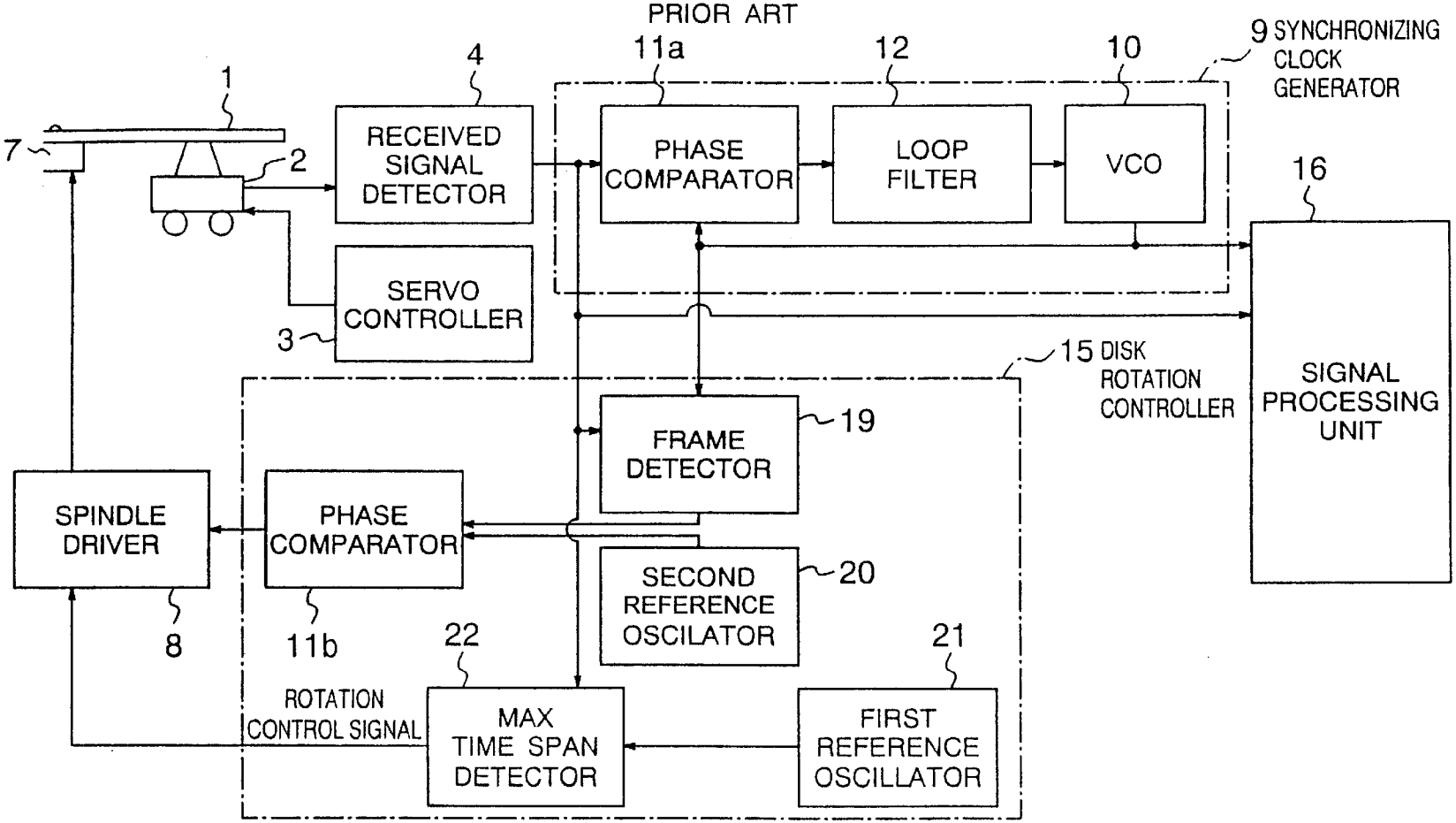
FIG. 18 PRIOR ART
FIG. 18 is a block diagram of the conventional optical disk apparatus.
Figure 19:
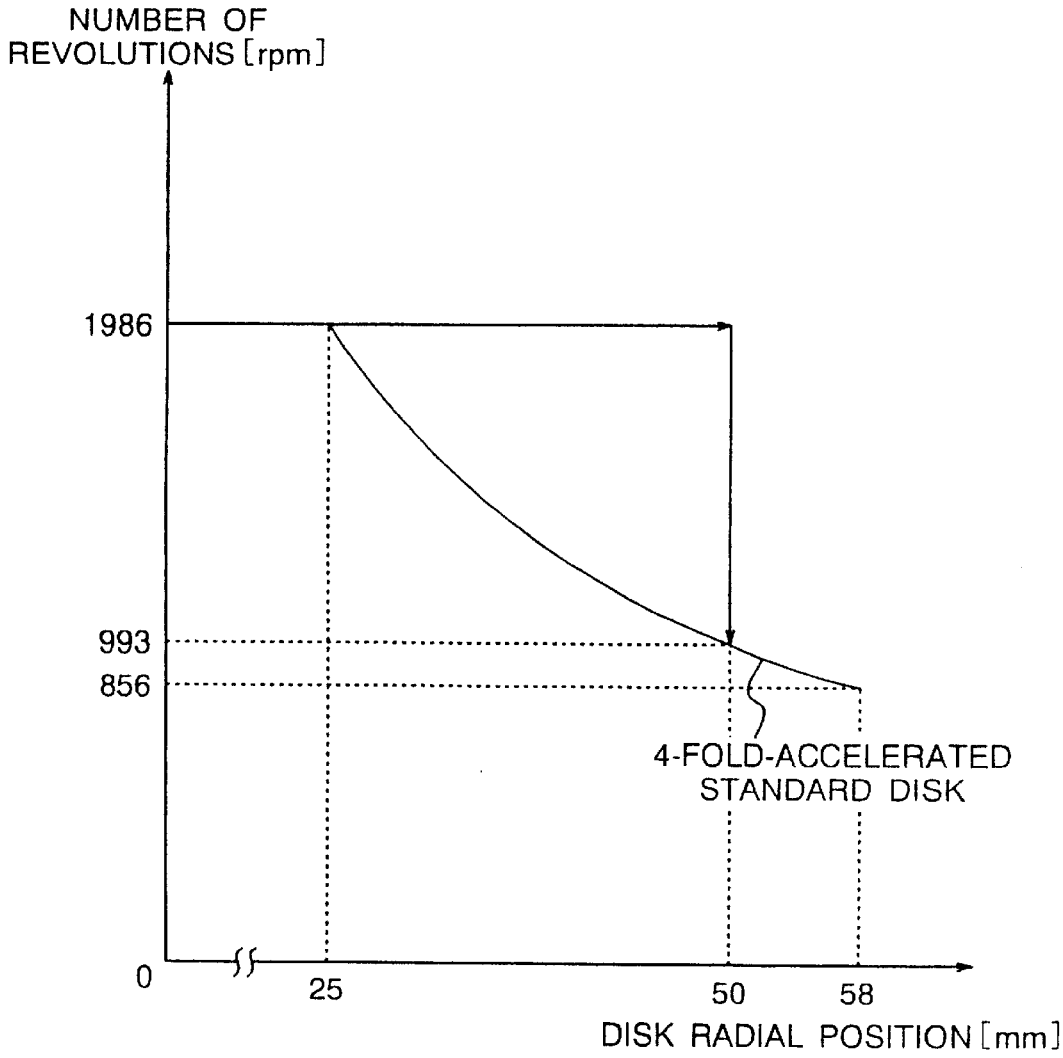
FIG. 19 PRIOR ART
FIG. 19 shows the relation between the optical disk radial position and the rotating velocity in the conventional 4-fold-accelerated constant linear velocity (CLV) control.

Description will now be made of a switching system between CAV control and CLV control in the fifth embodiment, and also of combination with the divided areas CAV control in the sixth embodiment. FIG. 15 is a diagram showing the relation between the disk radius and the rotating velocity in a seventh embodiment of the present invention. FIGS. 16A and 16B are diagrams showing the relation between the divided areas and the angular velocity. FIG. 17 is a flowchart for explaining the correcting action in area division in the seventh embodiment of the present invention.

In FIG. 15, like in the fourth and fifth embodiments, in the innermost circumferential area, CAV control (area 61) in 3-fold acceleration is performed, in the area to be covered by CLV control in 4-fold acceleration (area 62 at disk radial position of r4 to r5), CLV control in 4-fold acceleration is performed, and in the outermost circumferential area, divided areas CAV control (areas 63, 64 and 65) is performed.

As shown in FIG. 16A, the outermost circumferential area under CAV control is divided into three areas 63, 64 and 65 equi-distantly separated from one another according to previously set data in the area dividing means 45.

Suppose that the recording capacity of the optical disk 41 is A (S31) and that the result of calculating the radial position of a required track for recording A is rA (S32).

On the other hand, if the dividing intervals previously decided in the area dividing means 45 is rD, the following relation holds.

$$(R-r5)/3=rD \text{ (R: disk recording area outermost diameter)}$$

The number of divided areas for recording rA can be obtained as:

$$(rA-r5)/rD=m \ldots \text{ remaining capacity P 1(S33).}$$

As shown in FIG. 16A, the area width rP for recording the remaining capacity P is obtained (S34), which is compared with the dividing intervals rD (S35).

If the result is rP≦rD/2 (remaining capacity area width rP is less than ½ of the dividing intervals), as shown in FIG. 16B, without changing the number of divided areas m, $$(rA-r5)/m$$

is recorded as new dividing intervals (S36).

If rP>rD/2 (remaining capacity area width is more than ½ of dividing intervals), 1 is added to the number of divided areas, and $$(rA-r5)/(m+1)$$

is recorded as new dividing intervals (S37).

As mentioned above, in divided areas CAV control, the number of divided areas is varied according to the recording capacity, so that it is possible to provide an optical disk apparatus which can reduce the number of times of changing the disk speed in reproduction, and which features both low power consumption and high-speed access.

According to the seventh embodiment, when data is to be recorded on the optical disk, if on the outer circumferential area there remains no more data to be recorded and the remaining recording capacity is a little more than the divided area, the dividing intervals can be corrected flexibly. The seventh embodiment has been described by taking as an example a case where the optical disk radius is divided at equal intervals. However, even in a case where the recording area is divided into equal recording capacities, it is needless to say that the dividing interval can be corrected flexibly.

According to the present invention, in a range where the synchronizing clock generator can pull the reproduced signal into synchronism, the disk rotation is controlled at constant angular velocity using the current number of revolutions, but in a range exceeding the range where synchronization is possible, the disk rotation is controlled at constant linear velocity (CLV) to minimize the amount of changes of the number of disk revolutions of pull-in-synchronization, more than with the number of revolutions used until then.

The mode of control of disk velocity is changed according to the disk radial position. Data is accessed by switching over between CLV control of the spindle motor in which data is read at constant linear velocity and CAV control of the spindle motor in which the spindle rotation is constant.

The embodied examples of the present invention have been described using the VCO circuit and PLL circuit, which have a synchronization enable range of ±25% so that the variable disk speed range is from 3-fold acceleration to 5-fold acceleration. However, the present invention is not to be construed as limited to the above-mentioned synchronization enable range, but by using the similar control method, the present invention can be applied to variable velocity control with synchronization enable range of ±50% for a range from 2-fold acceleration to 6-fold acceleration.

Therefore, when the reproducing position of the optical pickup changes, the amount of change of the number of spindle motor revolutions can be minimized, the spindle motor can be driven with low power consumption and access time can be shortened. The present invention can provide a disk apparatus with superb characteristics. Data access is made possible with a minimized difference in data transfer rates between the inner circumferential area and the outer circumferential area, by which high-speed access and low power consumption can be made compatible.

What is claimed is:

1. An optical disk apparatus comprising:

a pickup unit including an optical unit for applying a laser beam emitted from a laser beam emitting element to an optical disk and converting its reflected beam into an electric signal, and a drive unit for driving said optical unit in a radial direction of said optical disk;

an RF amplifier for amplifying a signal from said pickup unit and outputting an RF signal;

a spindle driver for driving a spindle motor to a specified rotating velocity;

servo control means for outputting a second spindle motor control signal having a frequency that is variable within a predetermined range of synchronization relative to a basic frequency to control said spindle motor to a required linear velocity of said optical disk on the basis of said RF signal, and servo-controlling said spindle driver;

a processing unit for controlling said servo control means;

a speed controller for detecting a number of revolutions of said spindle motor, and outputting a first spindle motor control signal to control the spindle motor to a specified angular velocity; and select means for selecting said second motor control signal to have a frequency within a range of frequency in which said second motor control signal is in synchronization with said specified rotating velocity and selecting said first motor control signal to have a frequency within a range of frequency in which said second motor control signal is in a maximum or minimum value of synchronization, by control of said processing unit, wherein said processing unit, according to the radial position of said optical disk, switches over by means of said select means to record data on said optical disk between an area for controlling the spindle motor by CLV control so that its linear velocity is constant and an area for controlling the spindle motor by CAV control so that its angular velocity is constant.

2. An optical disk apparatus comprising:

a pickup unit including an optical unit for applying a laser beam emitted from a laser beam emitting element to an optical disk and converting its reflected beam into an electric signal, and a drive unit for moving said optical unit in radial direction of said optical disk;

an RF amplifier for amplifying a signal from said pickup unit and outputting an RF signal;

an actuator driver for driving said optical unit so that said laser beam is focused at a specified track position on said optical disk;

a spindle driver for driving said spindle motor to a specified rotating velocity;

servo control means for, on the basis of said RF signal, outputting a second spindle motor control signal having a frequency that is variable within a predetermined range of synchronization relative to a basic frequency to control said spindle motor rotation to a specified linear velocity of said optical disk and servo-controlling said actuator driver and said spindle driver;

a processing unit for controlling said servo control means and the whole apparatus;

a speed controller for detecting the number of revolutions of said spindle motor and outputting a first spindle motor control signal to control the spindle motor rotation so that the angular velocity is constant;

select means for selecting said second spindle motor control signal to have a frequency within a range of frequency in which said second spindle motor control signal is in synchronization with said specified rotating velocity and selecting said first spindle motor control signal to have a frequency within a range of frequency in which said second spindle motor control signal is in a maximum or minimum value of synchronization, by control of said processing unit, wherein said processing unit, according to the radial position of said optical disk, switches over by means of said select means to record data on said optical disk between an area for controlling the spindle motor by CLV control so that its linear velocity is constant and an area for controlling the spindle motor by CAV control so that its angular velocity is constant.

3. An optical disk apparatus comprising:

a pickup unit including an optical unit for applying a laser beam emitted from a laser beam emitting element to an optical disk and converting its reflected beam into an electric signal, and a drive unit for driving said optical unit in radial direction of said optical disk;

an RF amplifier for amplifying a signal from said pickup unit and outputting an RF signal;

an actuator driver for driving said optical unit so that said laser beam is focused at a specified track position on said optical disk;

a spindle driver for driving said spindle motor to a specified rotating velocity;

servo control means for, on the basis of said RF signal, outputting a second spindle motor control signal to control said spindle motor rotation to a specified linear velocity of said optical disk and servo-controlling said actuator driver and said spindle driver; and a processing unit for controlling said servo control means and the whole apparatus;

a speed controller for detecting the number of revolutions of said spindle motor and outputting a first spindle motor control signal to control the spindle motor rotation to a specified rotating velocity;

select means for switching over between said first and second spindle motor control signals by control of said processing unit;

area dividing means for dividing a recording area of said optical disk into a plurality of areas, deciding angular velocities varying in steps from one divided area to another and controlling the spindle motor at a constant angular velocity of the divided area in each divided area;

area division correcting means for varying the number of divided areas according to recording capacities, wherein said processing unit causes said select means to switch -over between an area for recording by spindle motor control performed so that the linear velocity is constant (CLV control) and an area for recording by spindle motor control performed so that the spindle motor rotates at a constant angular velocity (CAV control), and data is recorded on the optical disk, and wherein said area division correcting means varies said divided areas and said number of divided areas according to recording capacities.

4. An optical disk recording medium on which data is recorded as specified in claim 3.

5. An optical disk apparatus comprising:

a pickup unit including an optical unit for applying a laser beam emitted from a laser beam emitting element to an optical disk and converting its reflected beam into an electric signal, and a drive unit for moving said optical unit in a radial direction of said optical disk;

an RF amplifier for amplifying a signal from said pickup unit and outputting an RF signal;

an actuator driver for driving said optical unit so that said laser beam is focused at a specified track position on said optical disk;

a spindle driver for driving said spindle motor to a specified rotating velocity;

servo control means for, on the basis of said RF signal, outputting a second spindle motor control signal having a frequency that is variable within a predetermined range of synchronization relative to a basic frequency to control said spindle motor rotation to a specified linear velocity of said optical disk and servo-controlling said actuator driver and said spindle driver;

a processing unit for controlling said servo control means and the whole apparatus;

a speed controller for detecting the number of revolutions of said spindle motor and outputting a first spindle motor control signal to control the spindle motor rotation to a specified rotating velocity;

select means for selecting said second motor control signal to have a frequency within a range of frequency in which said second motor control signal is in synchronization with said specified rotating velocity and selecting said first motor control signal to have a frequency within a range of frequency in which said second motor control signal is in a maximum or minimum value of synchronization, by control of said processing unit;

area dividing means of dividing a recording area of the optical disk into a plurality of areas lying substantially concentrically in a radial direction, deciding angular velocities varying in steps from one divided area to another, and controlling the spindle motor at a constant angular velocity of the divided area in each divided area, wherein said processing unit causes said select means to switch over between an area for recording by spindle motor control (CLV control) performed so that the linear velocity is constant and an area for recording by spindle motor control (CAV control) performed so that the spindle motor rotates at a constant angular velocity, and data is recorded on the optical disk.

6. An optical disk apparatus according to claim 5, wherein said area dividing means varies the divided areas or the number of divided areas according to recording capacities.

7. A method of recording data on an optical disk, comprising:

a photo-electric conversion step of applying a laser beam to an optical disk and converting a reflected beam from the disk into an electric signal and data;

a rotating velocity control step of detecting a number of revolutions of a spindle motor to drive said optical disk at a specified rotating velocity, performing servo control, and outputting a first motor control signal;

a servo control step of servo-controlling said spindle motor by outputting a second motor control signal having a frequency that is variable within a predetermined range of synchronization relative to a basic frequency in order to drive said spindle motor at said specified rotating velocity on the basis of said electric signal; and a select step of selecting said second motor control signal to have a frequency within a range of frequency in which said second motor control signal is in synchronization with said specified rotating velocity and selecting said first motor control signal to have a frequency within a range of frequency in which said second motor control signal is in a maximum or minimum value of synchronization, by arithmetic process control, wherein according to a radial position of said optical disk, a recording area of the optical disk where said spindle motor is controlled so that the linear velocity is constant (CLV control), and a recording area where said spindle motor is controlled so that the rotation angular velocity is constant (CAV control), are switched over by said select step and the data is recorded on said optical disk.

8. An optical disk recording method, comprising the steps of:

a photo-electric conversion step of applying a laser beam to the optical disk and converting its reflected beam into an electric signal and data;

a rotating velocity control step of detecting the number of spindle motor revolutions to drive said optical disk at a specified rotating velocity, performing servo control, and outputting a first motor control signal;

a servo control step of outputting a second control signal and servo-controlling said spindle motor to drive the spindle motor at a specified rotating velocity according to said electric signal;

a select step of switching over said first motor control signal and said second motor control signal by processing control:

an area dividing step of dividing a recording area of the optical disk into a plurality of areas lying substantially concentrically in a radial direction, deciding angular velocities varying in steps from one divided area to another, and controlling the spindle motor at an annular velocity of the divided area in each divided area;

according to the areas divided by said area dividing step, providing an area for recording by controlling the spindle motor so that the linear velocity is constant (CLV control), and an area for recording by controlling said optical disk so that the rotation angular velocity is constant (CAV control); and switching over said areas by said select step and recording data on said optical disk, wherein said area dividing step includes an area division correction for varying the number of divided areas according to recording capacity.

9. A method of recording data on an optical disk, comprising the steps of:

photo-electric conversion for applying a laser beam to an optical disk and converting its reflected beam into an electric signal and data;

rotating velocity control for detecting the number of spindle motor revolutions to drive said optical disk at a specified rotating velocity, performing servo control, and outputting a first motor control signal;

servo control for outputting a second control signal and servo-controlling said spindle motor to drive the spindle motor at a specified rotating velocity according to said electric signal;

a select step of switching over said first motor control signal and said second motor control signal by arithmetic process control;

an area dividing step of dividing a recording area of the optical disk into a plurality of areas lying substantially concentrically in radial direction, deciding angular velocities varying in steps from one divided area to another, and controlling the spindle motor at a constant angular velocity of the divided area in each divided area;

an area division correcting step for varying the number of divided areas according to their recording capacities, wherein by said area division correcting step, said divided areas or said number of divided areas is varied according to their recording capacities;

on the basis of divided areas divided by said area dividing step, providing an area for recording by controlling the spindle motor so that the linear velocity is constant (CLV control), and an area for recording by controlling said optical disk so that the rotation angular velocity is constant (CAV control); and switching over said areas by said select step and recording data on said optical disk, or by using said area dividing step, varying said divided areas or said number of divided areas according to their recording capacities and recording data on said optical disk.

10. A method of recording data on an optical disk, comprising the steps of:

a photo-electric conversion step of applying a laser beam to the optical disk and converting its reflected beam into an electric signal and data;

a rotating velocity control step of detecting the number of spindle motor revolutions to drive said optical disk at a specified rotating velocity, performing servo control, and outputting a first motor control signal;

a servo control step of outputting a second control signal having a frequency that is variable within a predetermined range of synchronization relative to a basic frequency and servo-controlling said spindle motor to drive the spindle motor at a specified rotating velocity according to said electric signal;

a select step of selecting said second motor control signal to have a frequency within a range of frequency in which said second motor control signal is in synchronization with said specified rotating velocity and selecting said first motor control signal to have a frequency within a range of frequency in which said second motor control signal is in a maximum or minimum value of synchronization, by processing control;

an area dividing step of dividing a recording area of the optical disk into a plurality of areas lying substantially concentrically in a radial direction, deciding angular velocities varying in steps from one divided area to another, and controlling the spindle motor at an angular velocity of the divided area in each divided area;

according to the areas divided by said area dividing step, providing an area for recording by controlling the spindle motor so that the linear velocity is constant (CLV control), and an area for recording by controlling said optical disk so that the rotation angular velocity is constant (CAV control); and switching over said areas by said select step and recording data on said optical disk.

*11. An optical disk apparatus comprising:*

*a pickup unit including an optical unit for applying a laser beam emitted from a laser beam emitting element to an optical disk and converting its reflected beam into an electric signal, and a drive unit for driving said optical unit relative to said optical disk;*

*an RF amplifier for amplifying a signal from said pickup unit and outputting an RF signal;*

*drive means for driving the optical disk to rotate at a rotation velocity;*

*switching means for switching a driving control between CLV control and CAV control on a basis of the RF signal; and*

*control means for, while recording information on the optical disk from an inner portion to an outer portion of the optical disk in the radial direction thereof, controlling said switching means so as to switch from the CAV control to the CLV control, so that a change of said rotation velocity from the inner portion to the outer portion of the optical disk is reduced.*

*12. An optical disk apparatus according to claim 11, wherein said control means controls said drive means to change said rotation velocity successively when said switching means switches from the CAV control to the CLV control.*

*13. An optical disk apparatus according to claim 11, wherein said control means controls said switching means so as to switch from the CAV control to the CLV control when said rotation velocity in the CAV control reaches a predetermined value-fold acceleration.*

*14. An optical disk apparatus according to claim 11, wherein said control means controls said switching means so as to switch from CAV control to CLV control when a recording position in the CAV control reaches a predetermined radial position on the disk.*

*15. An optical disk apparatus comprising:*

*a pickup unit including an optical unit for applying a laser beam emitted from a laser beam emitting element to an optical disk and converting its reflected beam into an electric signal and a drive unit for driving said optical unit relative to said optical disk;*

*drive means for driving the optical disk to rotate at a rotation velocity;*

*switching means for switching a driving control of said drive means between CLV control and CAV control;*

*control means for, while recording information on the optical disk from an inner area to an outer area of the optical disk in the radial direction thereof, controlling said switching means so as to switch from CAV control to CLV control when said rotation velocity in the CAV control reaches a predetermined value-fold acceleration.*

*16. An optical disk apparatus according to claim 15, wherein said apparatus further comprises an RF amplifier for amplifying a signal from said pickup unit and outputting an RF signal, and said control means controls (i) said drive means to change said rotation velocity and (ii) said switching means to switch the driving control from CLV control to CAV control on the basis of the RF signal.*

*17. An optical disk apparatus according to claim 16, wherein said control means controls said drive means to change said rotation velocity successively when said switching means switches from the CAV control to the CLV control.*

*18. An optical disk apparatus comprising:*

*a pickup unit including an optical unit for applying a laser beam emitted from a laser beam emitting element to an optical disk and converting its reflected beam into an electric signal and a drive unit for driving said optical unit relative to said optical disk;*

*drive means for driving the optical disk to rotate at a rotation velocity;*

*switching means for switching a driving control between CLV control and CAV control; and*

*control means for, while recording information on a recording area of the optical disk from an inner area to an outer area of the optical disk in the radial direction thereof, controlling said switching means so as to switch from the CAV control to the CLV control when a recording position in the CAV control reaches a predetermined radial position on the disk.*

*19. An optical disk apparatus according to claim 18, wherein said apparatus further comprises an RF amplifier for amplifying a signal from said pickup unit and outputting an RF signal, and said control means controls (i) said drive means to change said rotation velocity and (ii) said switching means to switch the driving control from the CLV control to the CAV control on the basis of the RF signal.*

*20. An optical disk apparatus according to claim 19, wherein said control means controls said drive means to change said rotation velocity successively when said switching means switches from the CAV control to the CLV control.*

*21. An optical disk apparatus comprising:*

*a pickup unit including an optical unit for applying a laser beam emitted from a laser beam emitting element to an optical disk and converting its reflected beam into an electric signal and a drive unit for driving said optical unit relative to said optical disk;*

*drive means for driving the optical disk to rotate at a rotation velocity;*

*switching means for switching a driving control between CLV and a CAV control;*

*area dividing means for dividing a recording area of the optical disk into a plurality of areas according to recording capacities; and*

*control means for determining which control in said drive means is applied to the divided recording area of the optical disk in recording information on the optical disk.*

*22. An optical disk apparatus according to claim 21, wherein said apparatus further comprises an RF amplifier for amplifying a signal from said pickup unit and outputting an RF signal and said control means controls (i) said drive means to change said rotation velocity and (ii) said switching means to switch the driving control from the CLV control to the CAV control on the basis of the RF signal.*

*23. An optical disk apparatus according to claim 22, wherein said control means controls said drive means to change said rotation velocity successively when said switching means switches from the CAV control to the CLV control.*

* * * * *